US011526818B2

(12) United States Patent
Faulkner et al.

(10) Patent No.: US 11,526,818 B2
(45) Date of Patent: Dec. 13, 2022

(54) ADAPTIVE TASK COMMUNICATION BASED ON AUTOMATED LEARNING AND CONTEXTUAL ANALYSIS OF USER ACTIVITY

(71) Applicant: MICROSOFT TECHNOLOGY LICENSING, LLC, Redmond, WA (US)

(72) Inventors: Jason Thomas Faulkner, Seattle, WA (US); Eric Randall Sexauer, Woodinville, WA (US); Shalendra Chhabra, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/406,973

(22) Filed: Aug. 19, 2021

(65) Prior Publication Data
US 2022/0076188 A1 Mar. 10, 2022

Related U.S. Application Data

(63) Continuation of application No. 16/354,953, filed on Mar. 15, 2019, now Pat. No. 11,107,020.

(51) Int. Cl.
*G06Q 10/06* (2012.01)
*G06F 16/9032* (2019.01)
(Continued)

(52) U.S. Cl.
CPC ... *G06Q 10/063114* (2013.01); *G06F 16/908* (2019.01); *G06F 16/90332* (2019.01); *G06Q 10/06316* (2013.01); *G06Q 10/103* (2013.01)

(58) Field of Classification Search
CPC ............ G06Q 10/00–50/00; G06F 1/00–40/00
(Continued)

(56) References Cited

U.S. PATENT DOCUMENTS

| | | | | |
|---|---|---|---|---|
| 6,907,447 B1* | 6/2005 | Cooperman | ......... | G06Q 10/107 715/752 |
| 7,707,057 B2* | 4/2010 | Ward | ............... | G06Q 10/06316 705/7.29 |

(Continued)

OTHER PUBLICATIONS

"Office Action Issued in European Patent Application No. 20716628.1", dated Aug. 5, 2022, 7 Pages.

*Primary Examiner* — Alan S Miller
(74) *Attorney, Agent, or Firm* — Scott Y. Shigeta; Newport IP, LLC

(57) ABSTRACT

The techniques disclosed herein improve existing systems by automatically identifying tasks from a number of different types of user activity and providing suggestions for the tasks to one or more selected delivery mechanisms. A system compiles the tasks and pushes each task to a personalized task list of a user. The delivery of each task may be based on any suitable user activity, which may include communication between one or more users or a user's interaction with a particular file or a system. The system can identify timelines, performance parameters, and other related contextual data associated with the task. The system can identify a delivery schedule for the task to optimize the effectiveness of the delivery of the task. The system can also provide smart notifications. When a task conflicts with a person's calendar, the system can resolve scheduling conflicts based on priorities of a calendar event.

20 Claims, 18 Drawing Sheets

(51) Int. Cl.
  *G06F 16/908* (2019.01)
  *G06Q 10/10* (2012.01)
(58) Field of Classification Search
  USPC .................................................. 705/7.11–7.42
  See application file for complete search history.

(56) References Cited

U.S. PATENT DOCUMENTS

| | | | | |
|---|---|---|---|---|
| 7,877,409 B2* | 1/2011 | Lim | G06F 21/6218 | 709/229 |
| 7,881,957 B1* | 2/2011 | Cohen | G06Q 30/08 | |
| 7,885,844 B1* | 2/2011 | Cohen | G06Q 10/10 | |
| 8,006,189 B2* | 8/2011 | Dachs | G11B 27/329 | 715/723 |
| 8,108,206 B2* | 1/2012 | Hufnagel | G06F 40/56 | 704/4 |
| 8,255,258 B1* | 8/2012 | Cohen | G06Q 10/06 | 705/7.21 |
| 8,375,320 B2* | 2/2013 | Kotler | G06Q 10/109 | 715/764 |
| 8,645,182 B2* | 2/2014 | Johnson | G06Q 10/109 | 705/7.18 |
| 8,694,350 B1* | 4/2014 | Cohen | G06Q 10/10 | 705/7.13 |
| 8,898,178 B2* | 11/2014 | Kyomasu | G06F 8/61 | 707/754 |
| 9,141,260 B2* | 9/2015 | McCann | G06F 3/0486 | |
| 9,251,476 B2* | 2/2016 | Keohane | G06F 3/0482 | |
| 9,734,517 B2* | 8/2017 | Lee | H04W 68/02 | |
| 9,846,527 B2* | 12/2017 | Hull | G06Q 50/01 | |
| 9,904,435 B2* | 2/2018 | Savage | G06F 3/0482 | |
| 2002/0055868 A1* | 5/2002 | Dusevic | G06F 16/954 | 705/7.13 |
| 2004/0192440 A1* | 9/2004 | Evans | A63F 13/87 | 463/30 |
| 2005/0149927 A1* | 7/2005 | Abe | G06F 9/4887 | 718/100 |
| 2005/0177803 A1* | 8/2005 | Ruthfield | G06F 16/9558 | 715/854 |
| 2006/0026534 A1* | 2/2006 | Ruthfield | G06F 16/9558 | 715/854 |
| 2007/0073810 A1* | 3/2007 | Adams | H04L 51/04 | 709/205 |
| 2007/0130186 A1* | 6/2007 | Ramsey | G06F 16/951 | |
| 2007/0260989 A1* | 11/2007 | Vakil | G06Q 10/109 | 715/748 |
| 2008/0010601 A1* | 1/2008 | Dachs | H04N 5/222 | 348/E5.022 |
| 2008/0027915 A1* | 1/2008 | Karasudani | G06F 16/3326 | |
| 2008/0034315 A1* | 2/2008 | Langoulant | G06Q 10/107 | 715/780 |
| 2008/0306997 A1* | 12/2008 | Keohane | G06F 3/0482 | |
| 2009/0089133 A1* | 4/2009 | Johnson | G06Q 10/1097 | 705/7.21 |
| 2009/0235280 A1* | 9/2009 | Tannier | G06Q 10/00 | 719/318 |
| 2009/0240546 A1* | 9/2009 | Sato | G06Q 10/06 | 705/7.27 |
| 2010/0159909 A1* | 6/2010 | Stifelman | H04M 1/27475 | 455/418 |
| 2010/0169146 A1* | 7/2010 | Hoyne | G06Q 10/109 | 705/7.21 |
| 2010/0199338 A1* | 8/2010 | Craddock | G06F 21/31 | 726/7 |
| 2011/0087989 A1* | 4/2011 | McCann | G06F 3/04842 | 715/811 |
| 2011/0106892 A1* | 5/2011 | Nelson | G06Q 10/109 | 709/206 |
| 2011/0145822 A1* | 6/2011 | Rowe | G06Q 10/10 | 718/100 |
| 2011/0184943 A1* | 7/2011 | Norton | G06Q 10/02 | 707/723 |
| 2011/0237328 A1* | 9/2011 | Evans | A63F 13/77 | 463/43 |
| 2011/0307565 A1* | 12/2011 | Szady | H04L 51/58 | 709/206 |
| 2011/0314404 A1* | 12/2011 | Kotler | G06Q 10/109 | 715/772 |
| 2012/0143961 A1* | 6/2012 | Jonsson | G06Q 10/1093 | 709/206 |
| 2012/0278388 A1* | 11/2012 | Kleinbart | G06Q 10/06 | 709/204 |
| 2013/0179799 A1* | 7/2013 | Savage | G06Q 10/103 | 715/751 |
| 2013/0204673 A1* | 8/2013 | Gordon | G06Q 10/00 | 705/7.41 |
| 2014/0012616 A1* | 1/2014 | Moshenek | G06Q 10/063114 | 705/7.15 |
| 2014/0101572 A1* | 4/2014 | Gunderson | G06F 3/04886 | 715/758 |
| 2014/0108085 A1* | 4/2014 | Henriksen | G06Q 10/109 | 705/7.19 |
| 2014/0222580 A1* | 8/2014 | Lee | H04W 68/02 | 705/14.64 |
| 2014/0372162 A1* | 12/2014 | Dhara | G06Q 10/1095 | 705/7.19 |
| 2015/0324753 A1* | 11/2015 | Dantuluri | G06Q 10/1093 | 705/7.19 |
| 2016/0301639 A1* | 10/2016 | Liu | H04L 51/52 | |
| 2016/0335572 A1* | 11/2016 | Bennett | G06Q 10/107 | |
| 2017/0344931 A1* | 11/2017 | Shenk | G06F 3/0481 | |
| 2018/0060826 A1* | 3/2018 | Stratvert | G06Q 10/1095 | |

* cited by examiner

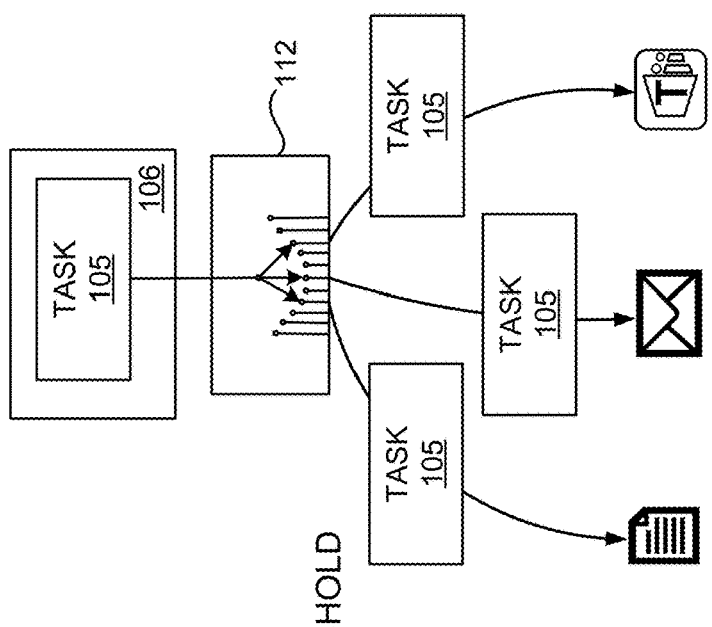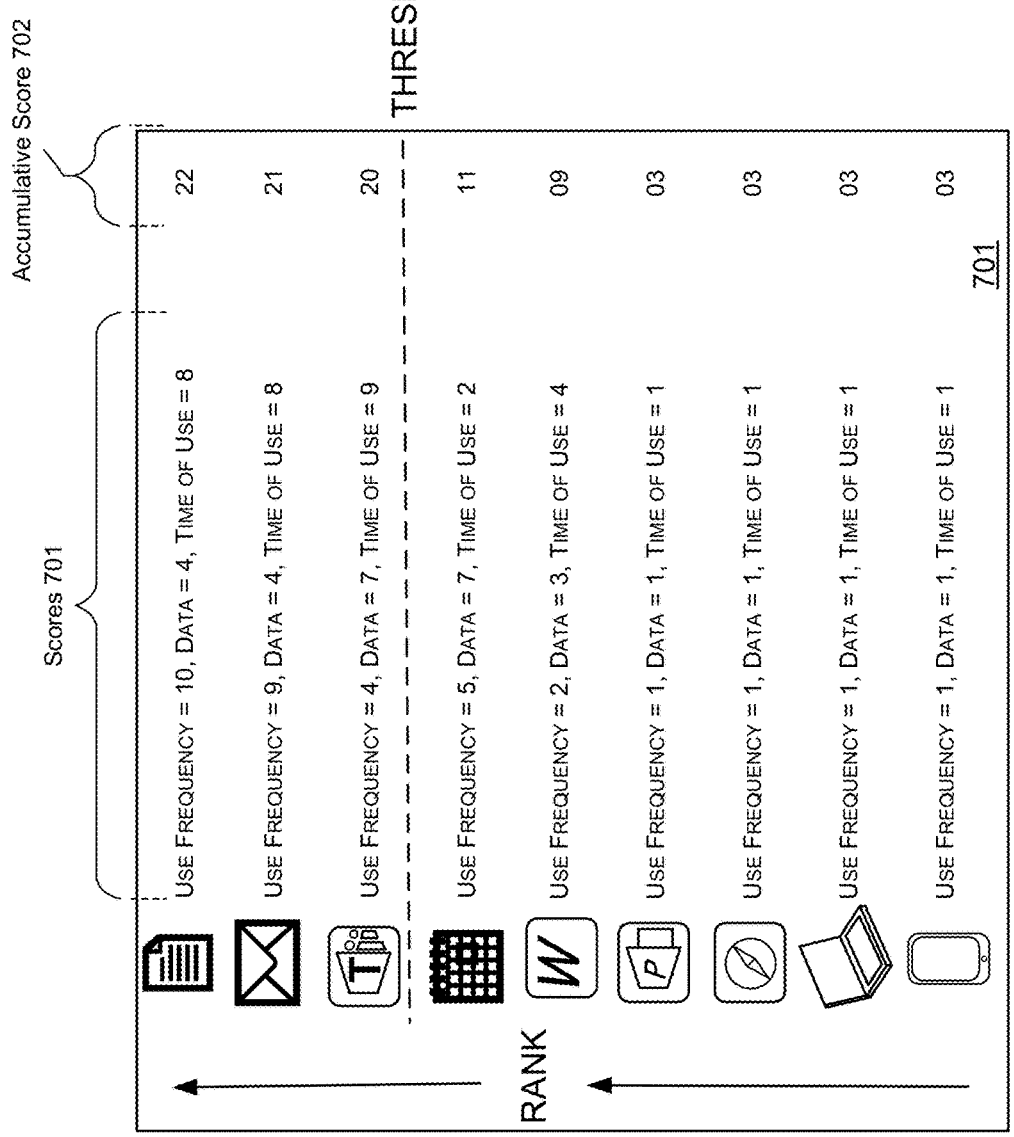
FIG. 7

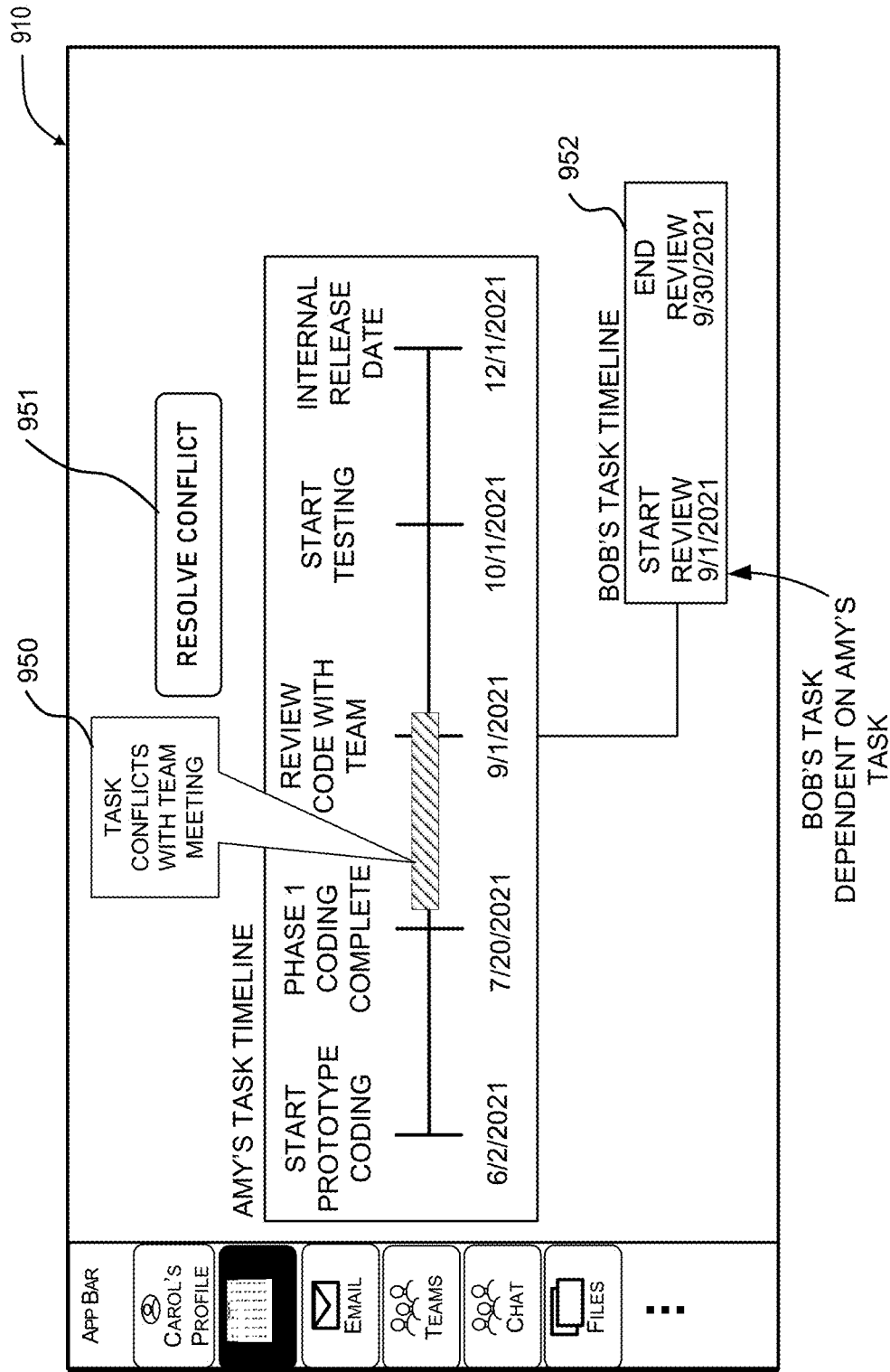

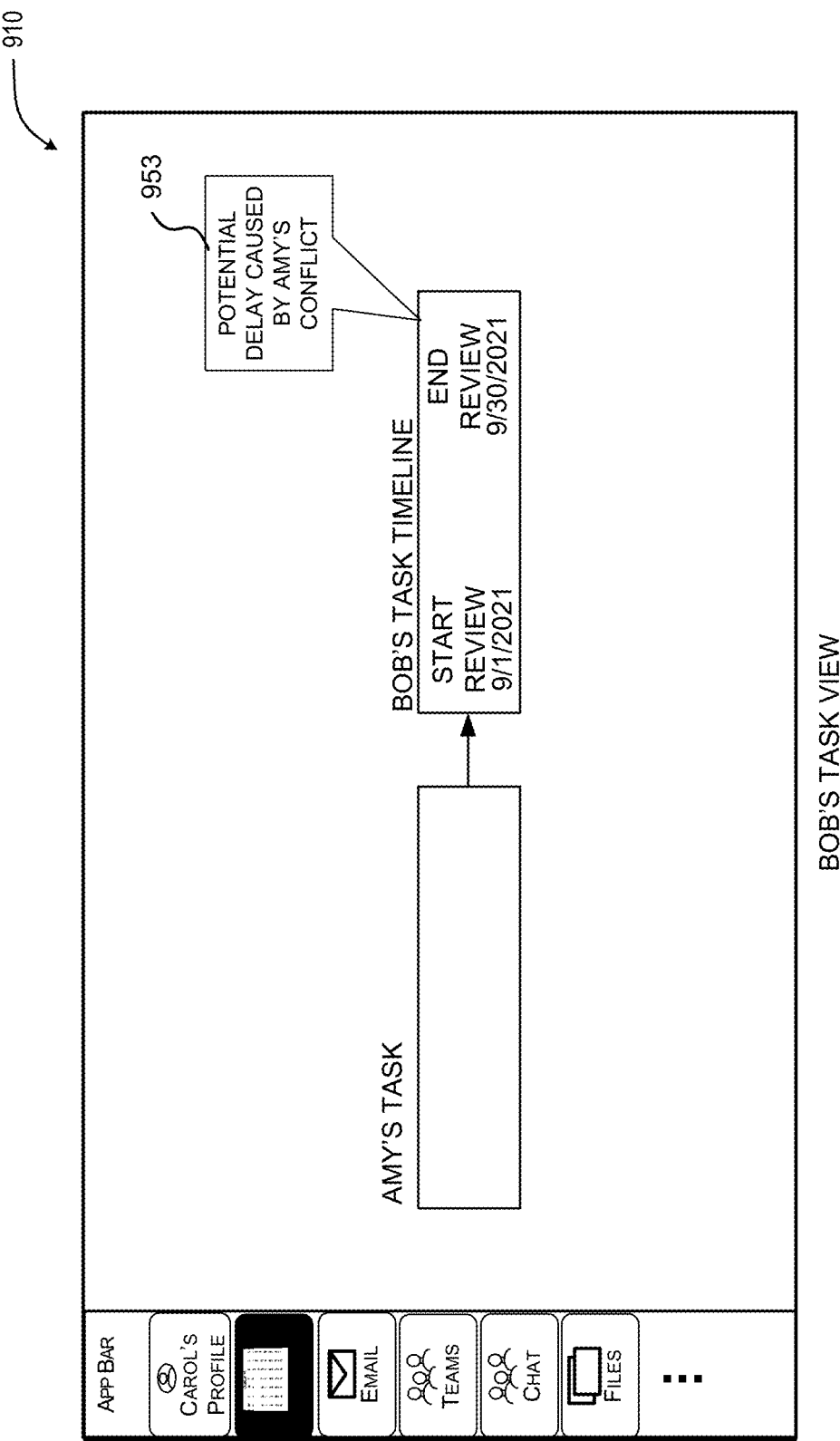

ADAPTIVE TASK COMMUNICATION BASED ON AUTOMATED LEARNING AND CONTEXTUAL ANALYSIS OF USER ACTIVITY

CROSS-REFERENCE TO RELATED APPLICATION

This application is a continuation of, and claims priority to, U.S. patent application Ser. No. 16/354,953, filed on Mar. 15, 2019 and entitled "Intelligent Task Suggestions Based on Automated Learning and Contextual Analysis of User Activity," the entire contents of which are incorporated herein by reference.

BACKGROUND

There are a number of different software applications that allow users to collaborate. In one example, some applications provide collaborative environments that enable users to exchange live video, live audio, and other forms of data within a communication session. In another example, some systems allow users to post messages to a board having access permissions for a select group of individuals for the purposes of enabling team-focused or subject-focused conversations.

Although there are a number of different types of systems and applications that allow users to collaborate, users may not always benefit from a particular exchange of information or a meeting using these systems. For example, although participants in a meeting may discuss specific tasks and goals, a number of manual steps are required for actual follow-through with each task and goal. For instance, for a particular follow-up task created during a meeting, a meeting participant may be required to set up one or more calendar events to ensure the relevant participants are engaged with that task after the meeting. And even though such tasks may be recorded, they may not be recorded within the right medium to engage the users at the right time. For instance, if a user is heavily focused on authoring a particular document, that user may not readily see their calendar regarding a particular task. Such drawbacks of existing systems can lead to loss of productivity as well as inefficient use of computing resources.

SUMMARY

The techniques disclosed herein improve existing systems by automatically identifying tasks and task owners from a number of different types of collaborative user activity. In some configurations, a system compiles the identified tasks and pushes each task to a personalized task list of a user. The tasks can also be delivered to a user by a number of delivery options that are selected based on a contextual analysis of the user's interaction with a number of applications and files. Such delivery options may include, but are not limited to, inserting the task into a file, posting the task within a communication thread, modifying user interfaces of productivity applications that are frequently used by a user, sending text messages, or providing system notifications. A task can be delivered to any type of application, platform, or file that meets one or more criteria. The system can identify timelines, performance parameters, and other related contextual data associated with the task. The system can also identify a delivery schedule for the task to optimize the effectiveness of the delivery of the task. By selecting the delivery option and a delivery schedule, the system is capable of delivering a task at the right place and at the right time. The system can also provide smart notifications in response to the detection of a scheduling conflict. For instance, when a task is assigned to a particular person ("assignee" or "task owner"), with specific target dates, the system can automatically check the assignee's calendar and provide notifications of any scheduling conflict to the assignee. Thus, if the assignee has a vacation planned or has other priorities, not only does the assignee receive notification, the system also provides recommendations to resolve any identified scheduling conflicts.

Among a number of other benefits, the system can also identify permissions for each user associated with a task. The permissions can control read/write permissions to particular communication threads, related files, or aspects of other contextual data that is delivered with the task. Thus, when a task is shared with a number of users, security for any compiled data can be maintained on a per-user basis.

The delivery schedule can define a number of different mechanisms for communicating the task and any associated contextual data. For example, a system may identify that a particular user associated with a task may interact with a number of different platforms and files, e.g., Word, a particular project word document, a particular Teams Site, and a particular web browser. Based on the user's interaction with these platforms and files, the system can rank each platform and file and build a schedule to deliver the task to each platform and file at an optimal time. Thus, in this example, based on the user's activity, the task can be concurrently posted to the user's Team Site, displayed on an in-application ("in-app") menu, and embedded into a particular word document.

In an example involving the in-app menu, the system can generate a message for communicating a task directly to a user that is engaged with that application regardless of the file they are working on. In one illustrative example, if a user is heavily engaged with one application, such as a word processing application, a system delivering a task can modify the menu of an application, and generate a notification that may be displayed directly in an in-app menu, e.g., the Office Ribbon.

The techniques disclosed herein can also modify a file that a user may be engaged with. For instance, a user may be engaged with a particular presentation file related to an identified task. When the system identifies that the presentation file has a threshold level of relevancy, the task, and any associated contextual data, may be inserted into the presentation file.

A system can rank a number of different delivery mechanisms (also referred to herein as "delivery options") based on user activity and machine learning data. For instance, if a system identifies that a user is not engaged with a calendaring program and is more engaged with a word processing program, the system may identify the word processing program as a better delivery mechanism for the task instead of generating calendar events. The system can optimize user engagement by ranking different delivery mechanisms and delivering the task to each option at specific points in time. By providing such an analysis, the system can provide contextually aware notifications and reminders at the right time and at the right place to drive efficient, collaborative behaviors.

In some configurations, individual user interface arrangements correspond to a specific application, file, webpage, etc. For instance, a first user interface arrangement can be associated with, e.g., generated by, a UI spreadsheet application, a second user interface arrangement can be associated with, e.g., generated from, a document, a third user interface arrangement can be associated with, e.g., controlled by, a desktop of an operating system, etc. In one illustrative example, such as the examples described herein, a presentation application can be associated with, or cause the generation of, a user interface arrangement. When a user spends a threshold amount of time with that particular user interface arrangement, the system can cause the display of a task in that user interface arrangement. This notification of a task in that user interface arrangement can be sent to or embedded in a program, file or operating system associated with that user interface arrangement. This provides an adaptive task communication feature that can cause a system to deliver task notifications as the user shifts usage to different files, applications or even operating system user interfaces.

The efficiencies derived from the analysis described above can also lead to more efficient use of computing systems. In particular, by automating a number of different processes for generating task reminders, user interaction with the computing device can be improved. The reduction of manual data entry and improvement of user interaction between a human and a computer can result in a number of other benefits. For instance, by reducing the need for manual entry, inadvertent inputs and human error can be reduced. This can ultimately lead to more efficient use of computing resources such as memory usage, network usage, processing resources, etc.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 7 illustrates an example scenario where scores associated with individual factors are used to select one more delivery mechanisms.

FIG. 9E illustrates an example of a channel entry that may be utilized to convey a task and a conflict with the task.

FIG. 9G illustrates an example of a graphical user interface showing a dependent task timeline concurrently displayed with a notification of a conflict.

DETAILED DESCRIPTION

Figure 1:
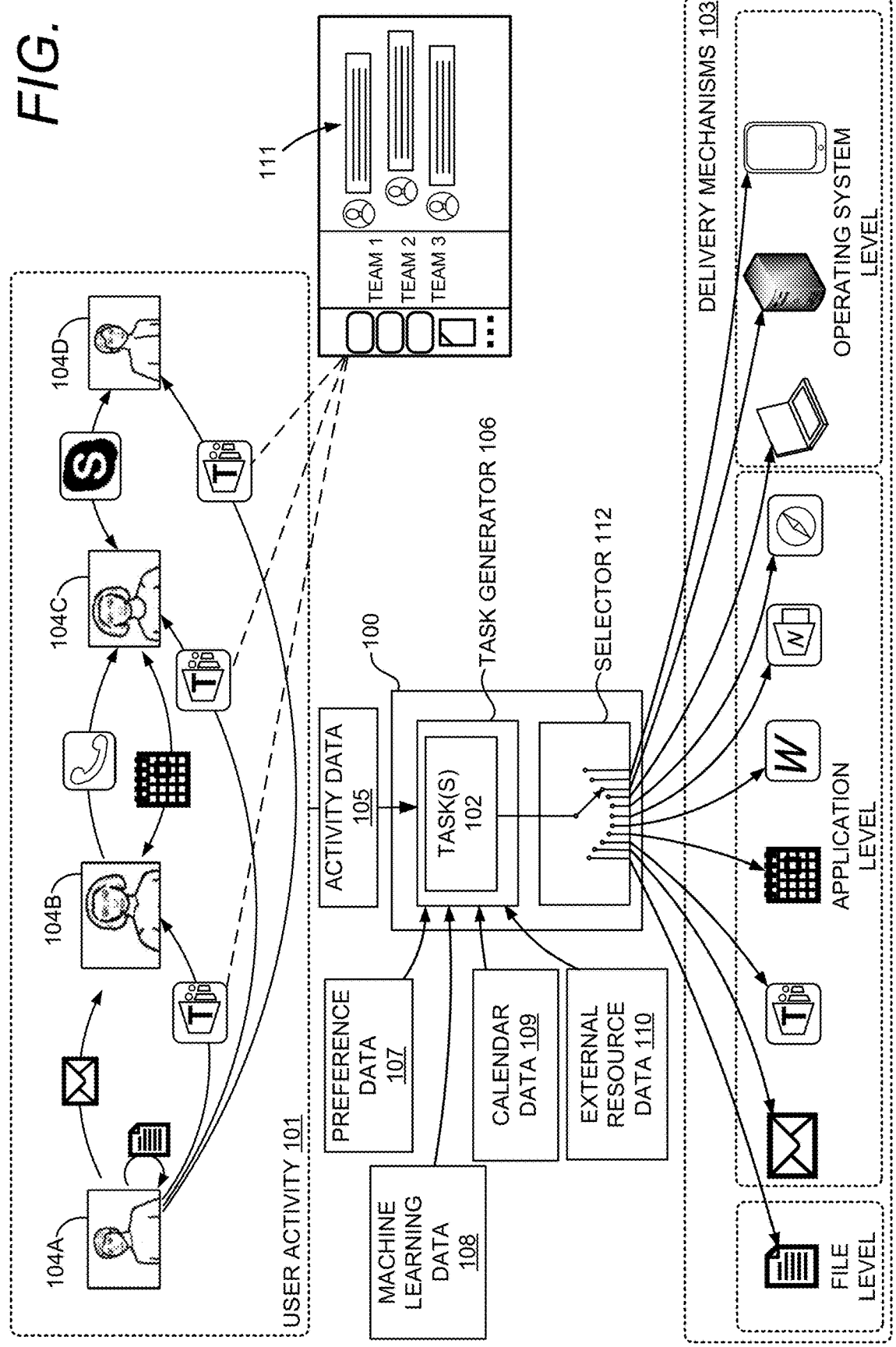
FIG. 1 illustrates a system used in an example scenario for illustrating aspects of the present disclosure.

FIG. 1 illustrates a system 100 in an example scenario for illustrating aspects of the present disclosure. The techniques disclosed herein improve existing systems by automatically identifying tasks from a number of different types of user activity 101 and providing task recommendations 102 (also referred to herein as "tasks 102") to one or more selected delivery mechanisms 103. As shown, the user activity 101 can involve any number of different types of applications, platforms, files, and communication mediums utilized by a number of users 104 (104A-104D). The system 100 can analyze any type of user activity such as, but not limited to, a user's interaction with a document or file, email communications, channel communications, private chat communications, voice or video communications, user interactions with a calendar, and any other type of user activity between a person and a computer.

The activity data 105 defining the user activity 101 can be parsed and analyzed to identify a task to be performed by one or more users. A task generator 106 can analyze the activity data 105 in conjunction with other data such as preference data 107, machine learning data 108, calendar data 109, and external resources 110 to generate a task 102 and to identify any users 104 associated with the task 102. For example, a number of team meetings, emails, and channel conversation messages 111 may be analyzed by the system 100 and the system may determine that a particular person needs to build a prototype prior to an event. When such an indication is detected, the task generator 106 generates a task description from keywords in the activity data 105. The task generator 106 can also determine a timeline, e.g., a deadline, and other parameters for the task 102. The parameters may define aspects of the task. For instance, if a task involves the production of a prototype, the parameters may indicate a color, size, shape, etc.

The system 100 can generate a number of sentences that can be used to generate a task description. In addition, the system can also select sentences and phrases from analyzed content to be used in a task description. In some configurations, the sentences can be generated or selected from any communication stream, file, or shared data that meets a threshold requirement. In one illustrative example of a threshold requirement, a task description can be generated from analyzed content based on a priority of a particular topic. For instance, if there are several different sources of activity data, e.g., messages or files, that state: "we need a prototype," "a prototype would help with the design process," "we need help with a prototype," and "we are stalled until a prototype is available," the number of occurrences of a particular word can be used to determine a priority for a keyword, e.g., "prototype," and the priority can be compared against threshold. If the number of occurrences of a particular keyword exceeds the threshold, the system 100 can determine that particular keyword as a topic, and an associated priority can be based on the number of times the keyword is used. The system can then generate a number of sentences around that topic. In the current example, it is a given that the word "prototype" occurs a threshold number of times. In response to this determination, the word "prototype" is given a priority that causes the system to generate a number of sentences around this selected word. Other words, also referred to herein as supporting words, that surround the selected word can be used to generate sentences. Some supporting words can include, but are not limited to, words such as "need," "help," etc. Stock phrases can be used, such as "The team _____ a _____." The system 100 can populate the fields of such stock phrases with the selected word and the supporting words to result in a sentence, e.g., "The team needs a prototype."

It can be appreciated that a priority for a keyword or topic can be based on a number of other factors. For instance, a priority can be based on interpreted language from one or more aspects of the user activity 101. For instance, the words "important" or "urgent" can raise the priority of a particular set of content. Other predetermined adjectives or adverbs may be utilized in conjunction with a word count of a particular keyword to raise or lower a priority. These examples are provided for illustrative purposes and are not to be construed as limiting. It can be appreciated that any suitable interpretation or analysis of a document can be used to associate a priority for a keyword.

In some configurations, the system may only count certain categories of keywords, such as nouns or verbs. Some words can be ignored such as "the," "and," "she," "he," etc. In addition, the system may also select a number of sentences from the activity data and quote those sentences. General algorithms for checking the grammar of each sentence may be utilized. If a sentence within the activity data 101 meets one or more criteria, e.g., that it is a complete sentence, it has proper grammar, and/or it contains a topic, the system may quote the sentence within a task description.

Figure 2:
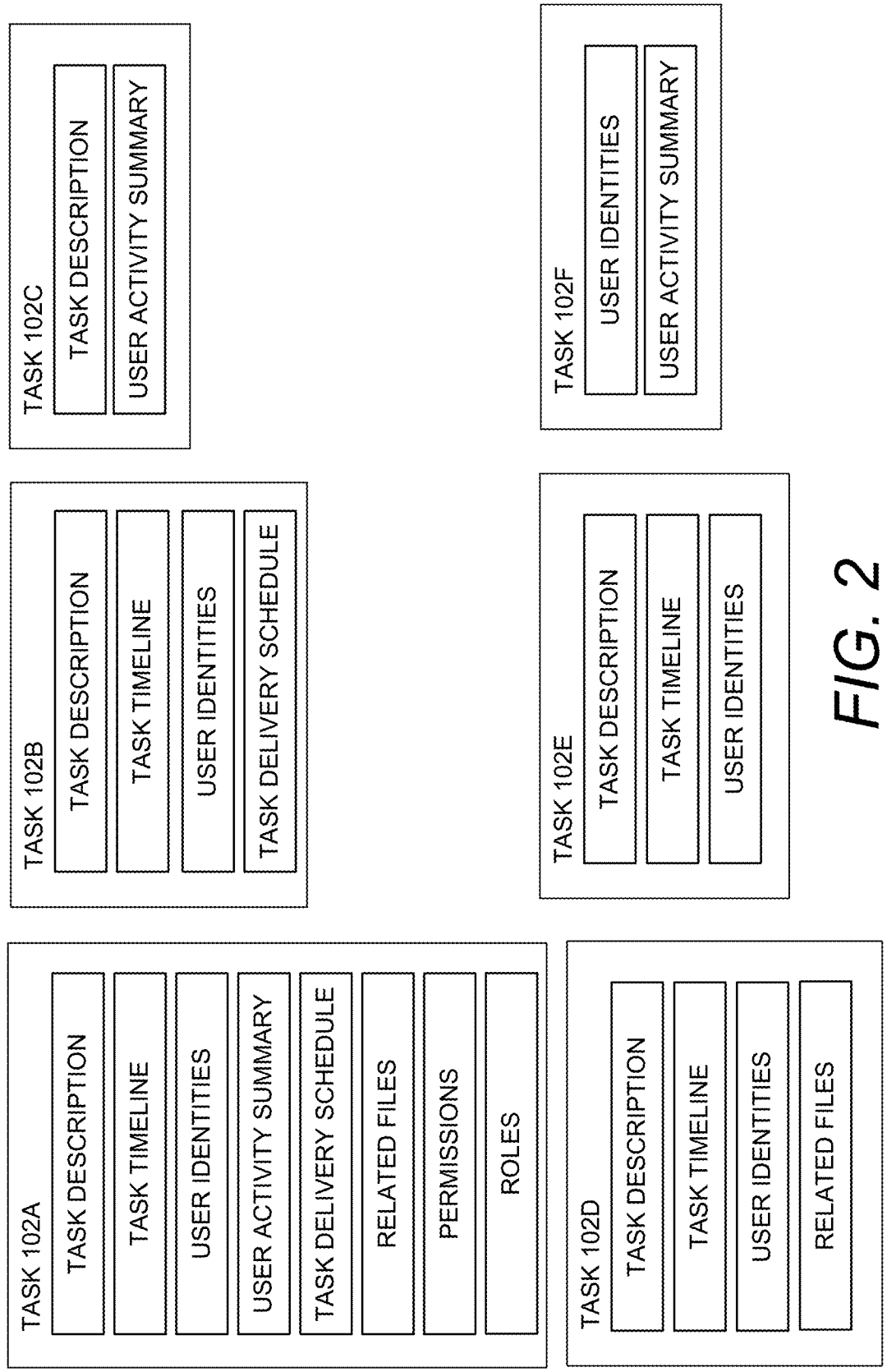
FIG. 2 illustrates a number of examples of structures for the task data.

A task 102 can include a number of different attributes. FIG. 2 illustrates a number of example data structures for a task 102, which can be referred to herein as "task data 102." In a first example, a task 102A may include a task description, a task timeline, one or more user identities, a user activity summary, a task delivery schedule, related files, permissions, and roles. In a second example, a task 102B may include a task description, a task timeline, one or more user identities, and a task delivery schedule. In third example, a task 102C may include a task description and a user activity summary. In a fourth example, a task 102D may include a task description, a task timeline, one or more user identities and related files. In another example, a task 102E may include a task description, a task timeline, and one or more user identities. In yet another example, a task 102F may include one or more user identities and a user activity summary.

A task description can include a coordinated sequence of sentences that describes a task to be performed. A task description can include computer-generated sentences that summarize the user activity 101. The task description can also include sentences and keywords extracted from content associated with the user activity 101. For instance, if a series of meetings, streaming broadcasts, channel posts, and other forms of communication indicate a need for a particular follow-up task, the system 100 can analyze such activity and generate a number of sentences to describe the task. In addition, direct quotes extracted from any content derived from the user activity 101 can be integrated as part of a task description. In one illustrative example, one or more conversations in a meeting may be detected in which the user may indicate a need for a prototype to complete a particular stage of a development process. Such user activity can be interpreted to generate a task description indicating that task.

The task timeline can include one or more dates and/or times to indicate milestones or deadlines with respect to a task. The task timeline can include a computer-generated date or time based on an analysis of the user activity 101. For instance, an analysis of several documents, emails, channel posts, calendar events, and other forms of communication can be interpreted to identify a time and/or a date for a particular task. For instance, in response to a detection of a task, such as a need to develop a prototype, the system 100 can analyze a number of other milestones or events, such as a number of calendar events, indicating stages of the development process. The stages and/or other communication can be interpreted to develop a task timeline which may include a single deadline or a number of different deadlines for a particular task. Each deadline may also be associated with a priority based on a confidence level of the interpretation of the user activity 101.

The user identities can include any type of data that refers to a particular person or group of people. In some configurations, user identities can be interpreted from the user activity 101. Individuals or groups of people can be identified by their interpretation of calendar events, channel posts, emails, documents, or any other data that indicates a user that may be associated with the task 102. Names and identities, and any contact information, may be derived from a person's association with a communication channel, meeting, document, audio file, video file, or any other data derived from an analysis of any user activity 101. The user identities can include any type of identifier for a user or a group of users that have a threshold relevancy to a task. The relevancy of a person may be based on a confidence level that is generated based on the activity data 101. For instance, if a person mentions that "Bob" is to create a prototype, and Bob is a member of a channel associated with the person making that statement, Bob's user identity may be identified as having a threshold level of relevancy. A threshold level of relevancy may include any identity having a direct correlation to a particular meeting in which that individual is mentioned or if somebody mentions the identifier directly within a communication, e.g., a person states an email address, a first name and last name, etc. The user identities can also be identified by the use of titles, roles, or any other description that may be mentioned or referenced within any type of user activity 101.

The user activity summary may include a description of the user activity 101 that was used to generate the task 102. For example, if the system 100 determined that a select group of emails, a select set of calendar invitations, and several documents were used to form a task, the user activity summary may describe the meetings, emails and related documents to add context to the task. In some embodiments, the user activity summary may also include links or excerpts of the source for a particular task. For instance, if the system 100 detects that a particular posting of a channel describes a task for a person, e.g., Bob needs to build a prototype, the user activity summary may include a link to the posting or an identifier for the posting. The links or the excerpts can also be included in other attributes of the task 102, such as the task description.

The task delivery schedule may include a timeline defining events for delivering a task 102 or portions of a task 102 to a particular person or a group of people. As described in more detail below, a task 102 may need to be delivered to a person on more than one occasion to increase the probability that the message will be delivered to the intended recipient. The system 100 can utilize the task delivery schedule to communicate various aspects of a task 102 based on deadlines or timelines indicated in a task. In some configurations, a task or portion of the task can be delivered at various times using different delivery mechanisms 103. For instance, a first reminder of a task can be delivered via email, then later the system 100 may embed aspects of a task 102 within a document, then later post aspects of a task to a channel.

Files may also be embedded or referenced within a task 102. In some configurations, files having a threshold level of relevancy to a task 102 may be identified by the analysis of the user activity 101. For instance, if a conversation references a specific document by name, such a document may be included in a task 102. If a file is attached to a meeting request or otherwise attached to emails that were sent during a meeting, such a file may be deemed as having a threshold level of relevancy, and the file may be included in a task 102. A file may have a threshold level of relevancy based on a number of factors. For instance, a number of keywords shared between a particular task and a document may be used to determine if the document has a threshold level of relevancy to a task. Phrases and sentences of a particular document may also be scored based on the number of common phrases or terms that the document may have with a particular task. If a system determines that a particular document and a task have a threshold number of common phrases or terms, such documents may be embedded or referenced within a task 102. Files having a threshold level of relevancy may be embedded within a particular task 102 or files may be linked or otherwise referenced within a task 102.

The task 102 may also define a number of permissions. In some configurations, the permissions may define access rights to the selected files or other attributes of a task 102. In one illustrative example, if a task 102 having an embedded file is delivered to a number of people, the permissions may grant one recipient read and write access to the file while only permitting the other recipients read access permissions. The permissions may be based on the access rights of an original owner of the document and a relationship between the recipients of the task and the original owner. For instance, if the original owner had read/write access to a file, and that original owner is on the same team as all of the recipients, the recipients may receive the same permissions. Certain aspects of the permissions may be more restricted as a relationship between the recipients of a task and an original owner of the delivered content become less clear. For instance, if the original owner is a mid-level manager, and the recipients of the task 102 are higher level employees, the recipients may receive the same or more relaxed permissions with respect to the delivered content. However, if the original owner who is a recipient of the task 102 is a manger of the recipients, the recipients may receive more restricted permissions, such as read-only permissions or permissions that have an expiration date. More restricted permissions may be granted to recipients if they are in different teams or not directly associated with the original owner based on an interpretation of contextual data, such as an org chart.

A task may also define a number of roles for each user identity. In some configurations, the activity data 101 may define a meeting that is part of a channel. In such an embodiment, the meeting or the channel may define roles for each participant. For instance, based on the definitions defined in a channel or within organizational data, one person may be designated as a manager, another person may be designated as a designer, and another person may be designated as a tester. Those interpreted roles may be utilized to distribute different aspects of a task, such as different versions of the task description, to each person. The roles may also be used to determine the permissions. For instance, if an identified file related to a task 102 is interpreted and identified as being relevant to the design work of a project, access permissions for that file may be less restrictive to the designer and more restrictive to the other recipients having other roles.

These examples shown in FIG. 2 are provided for illustrative purposes and are not to be construed as limiting. It can be appreciated that a task 102 can include any combination of the described attributes. For instance, a task 102 may only include a task description, or a task 102 may only include an activity summary.

Figure 3:
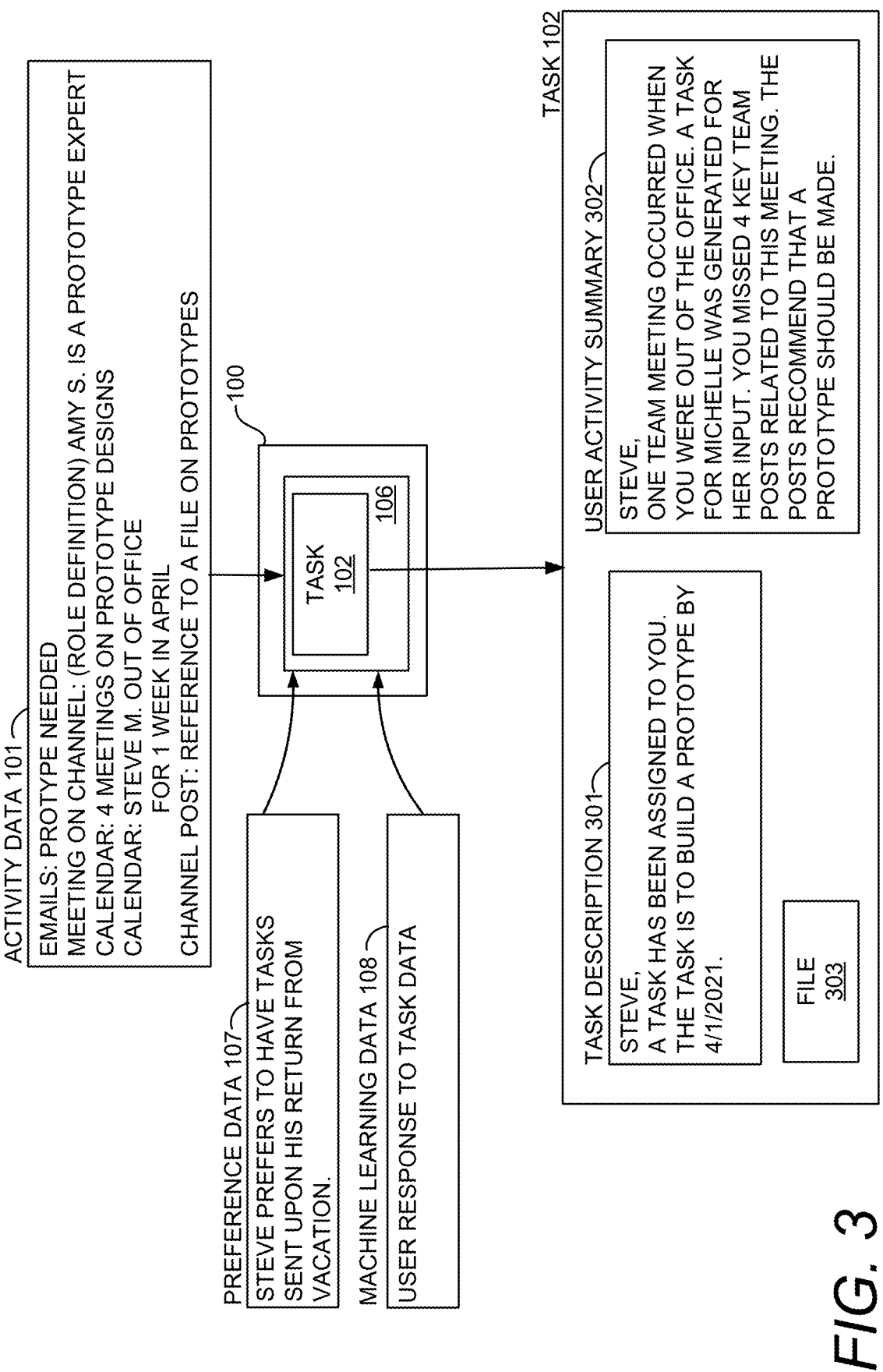
FIG. 3 illustrates an example where a task is generated from a particular set of activity data, preference data, and machine learning data.

FIG. 3 illustrates an example in which a task 102 is generated from contextual data such as the activity data 101, preference data 107, and machine learning data 108. In this example, the activity data 101 includes several emails indicating that a prototype is needed and identification of a meeting on a channel describing a role definition of Amy S. as a prototype expert. The activity data 101 also includes several calendar events defining several meetings for a prototype design and another calendar event indicating that a person, Steve, is out of the office for one week in April. The activity data 101 also includes a channel post that includes reference to a file on several prototypes.

Also, in this example, the preference data 107 indicates a priority of a particular user. In this example, Steve prefers that tasks are to be delivered when he returns from vacation. Generally described, the machine learning data 108 can define any type of activity of a user. The machine learning data 108 can be processed by the system 100 to generate and modify a task. In addition, the machine learning data 108 can be utilized to determine the best delivery mechanism 103 for a task 102. In this example, the machine learning data 108 indicates that Steve has responded to tasks 102 that have been delivered to him in the past.

Given the various sources of contextual data for this example, the task generator 106 generates a task 102 that includes a task description 301, a user activity summary 302, and a reference to a file 303. As shown, the task description 301 includes a plain text description of the activity data 101. In addition, the task description 301 indicates a user identity, Steve, and a due date, Apr. 1, 2021. The task description 301 can be generated by an analysis of the contextual data such as the activity data 101, preference data 107, and machine learning data 108.

Also shown in FIG. 3 is the user activity summary 302. In this example, the user activity summary 302 includes a note to Steve summarizing the meetings that occurred during his vacation. To achieve this, the system 100 can analyze a timeframe in which Steve was out of the office. The system 100 can then analyze the meetings that occurred during this determined timeframe. In some configurations, the system 100 can filter information that is to be added to the user activity summary 302. For instance, the system 100 can include a description of events that have a threshold level of relevancy to the task 102. For instance, meetings that are used to generate the task, e.g., having text or other data related to the task, can be described in the user activity summary 302. The user activity summary 302 can also include other information and attributes such as short summaries of the task description, permissions, user identities, files, etc.

The example shown in FIG. 3 also shows that the task 102 includes a file 303. As summarized above, the file 303 can be embedded to the task 102, linked to the task 102, or referenced within the task 102, if the file 303 has a threshold level of relevancy to the task 102. A file 303 can have a threshold level of relevancy if the file is directly referenced within an event, post, or communication of the user activity 101. In this example, a channel post references the file, and thus the file 303 is included in the task 102.

Figure 4:
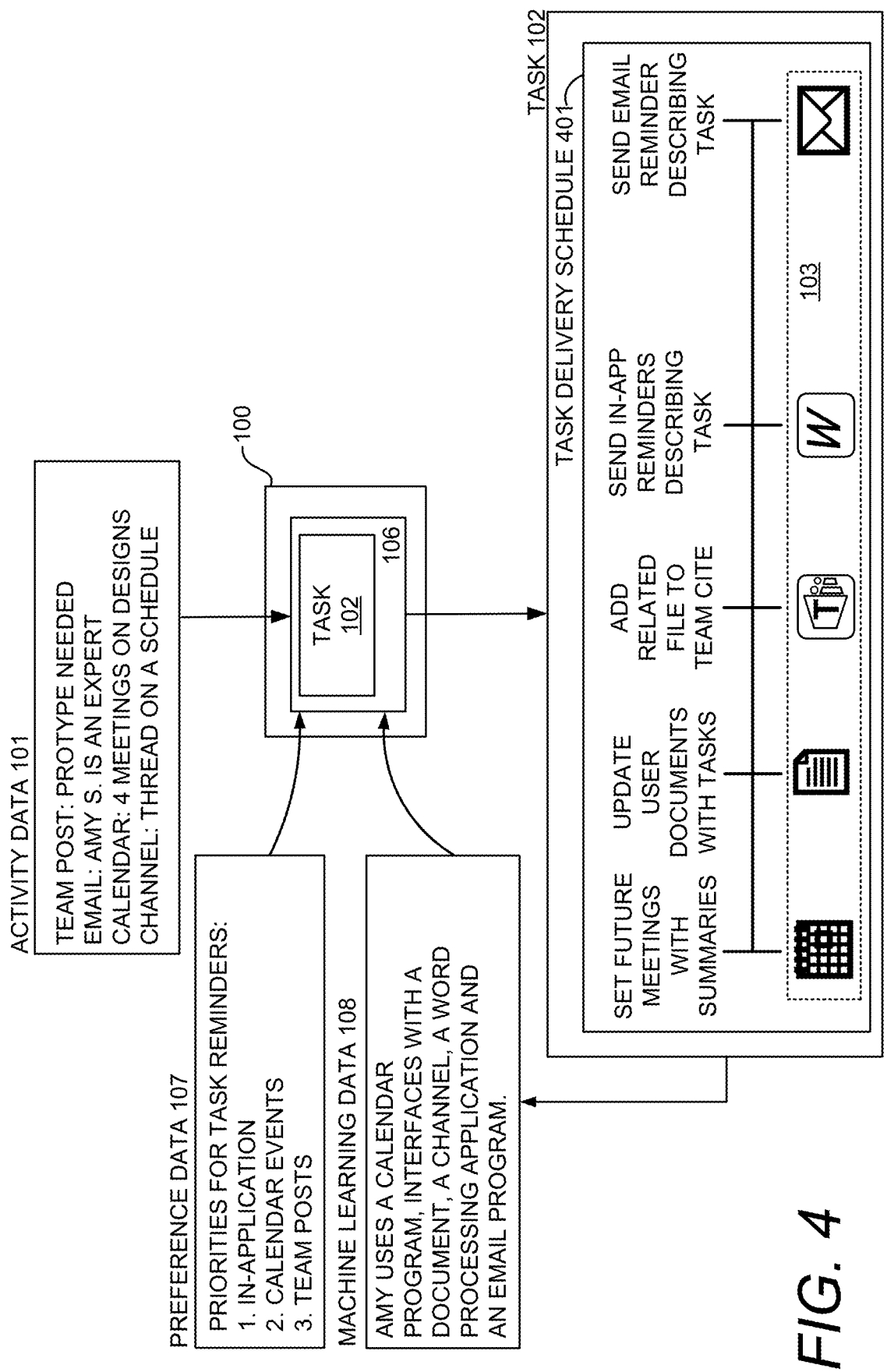
FIG. 4 illustrates an example where a task delivery schedule is generated from contextual data such as the activity data, preference data, and machine learning data.

FIG. 4 illustrates an example where a task delivery schedule 401 is generated from contextual data such as the activity data 101, preference data 107, and machine learning data 108. In this example, the activity data 101 includes a channel post indicating that a prototype is needed. The activity data 101 also includes several emails indicating an expert for the prototype, e.g., Amy S. The activity data 101 also includes several calendar events indicating four meetings. In addition, the activity data 101 includes channel data which includes a thread describing a schedule.

In this example, the preference data 107 shown in FIG. 4 indicates that a user, in this case, Amy, prefers in-app messages, calendar events and channel posts. In addition, machine learning data 108 indicates that Amy frequently uses a calendar program. In addition, the machine learning data 108 indicates that Amy interfaces with a document, a channel, and a word processing application frequently. The machine learning data 108 also indicates the Amy utilizes an email program frequently.

Based on the contextual data, the system 100 generates a task delivery schedule 401 that includes a number of deadlines and milestones that were generated based on an interpretation of the activity data 101, preference data 107, and machine learning data 108. As shown, the task delivery schedule for one task includes a timeline having a number of milestones and deadlines based on an interpretation of the schedule provided in the activity data 101. Specific delivery mechanisms 103 are selected based on the preference data and machine learning data. Since the recipient, Amy, has interactions with a document, a channel, a word processing application, and an email application frequently, the system 100 can utilize these applications and files as an option for delivering the task 102 to Amy.

As the recipient of the task 102 interacts with each of the delivery mechanisms 103, the system 100 can analyze these types of interactions and update the machine learning data 108. For instance, if the first deadline of the delivery schedule utilizes a calendar event to deliver the task 102, and the recipient never opens the calendar event, the system may resend a notification about the first deadline and also make adjustments to other milestones or deadlines so as to thereafter use other delivery mechanisms 103 rather than a calendaring program.

This example is provided for illustrative purposes and is not to be construed as limiting. It can be appreciated that any combination of delivery mechanisms 103 can be utilized and each mechanism can be selected based on a time of use, frequency of use, and a contextual relevancy of each use. For sample, if it is determined that a recipient of a task 102 only interacts with a particular document within a specific week of the month, that document may be selected as a delivery mechanism 103 for the task 102 if a particular milestone or deadline for the content to be delivered coincides with that specific week.

Figure 5:
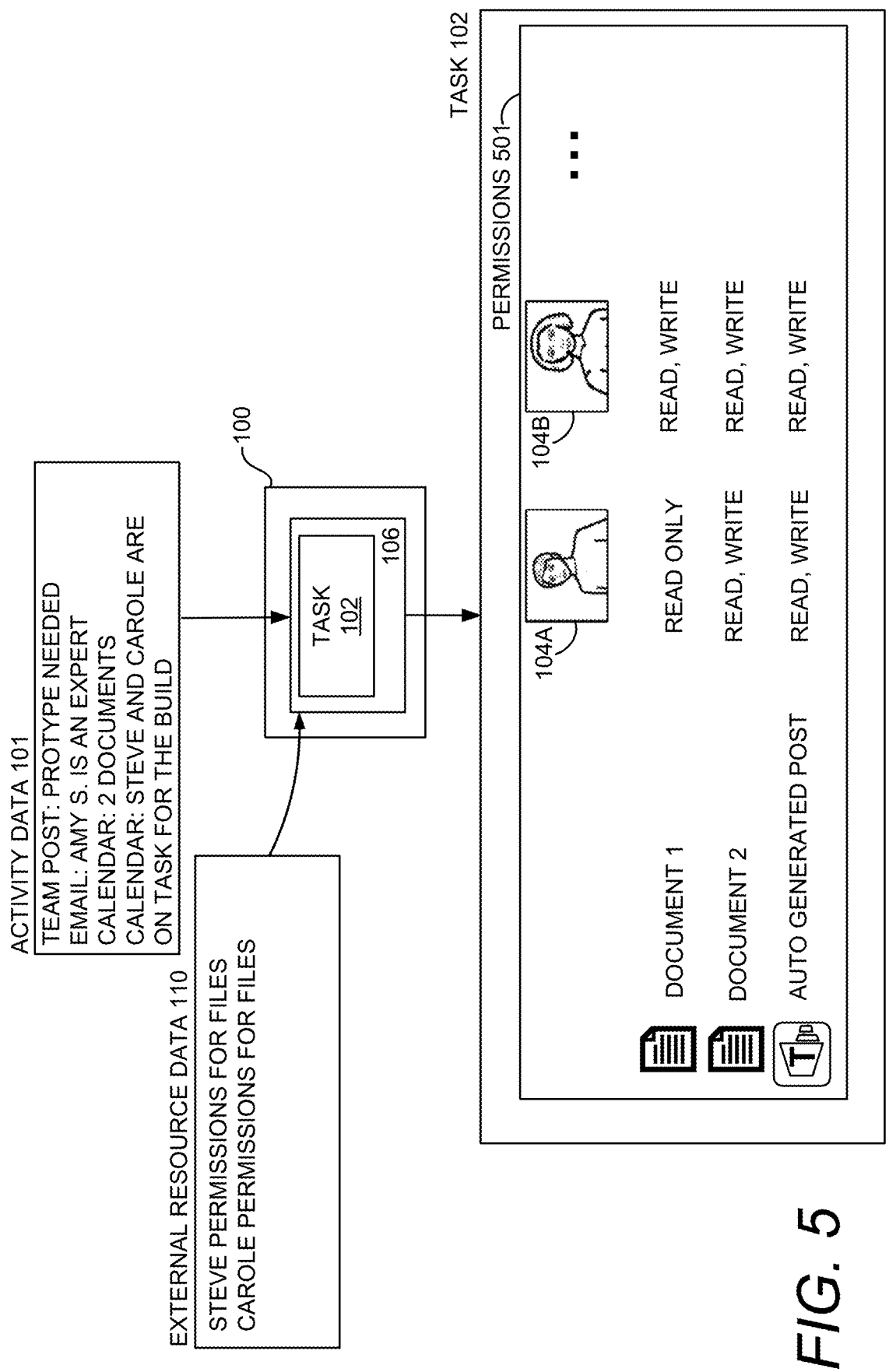
FIG. 5 illustrates an example where permissions are generated from contextual data such as the activity data and external resource data.

FIG. 5 illustrates an example where permissions 501 are generated from contextual data such as the activity data 101 and external resource data 110. In this example, the activity data 101 includes a channel post indicating that a prototype is needed. The activity data 101 also includes several emails indicating the name of an expert for the prototype, e.g., Amy S. The activity data 101 also includes several calendar events referencing two documents and also calendar events indicating Steve (104A) and Carole (104B) are tasked with a build of the prototype. The external resource data 110 defines permissions for Steve (104A) and Carole (104B) with respect to several files including the files that were referenced in the calendar events. The external resource data 110 may be in the form of a data store, database, or any other resource capable of storing and communicating permissions for individual user identities.

The system 100 can analyze the contextual data and generate permissions 501 for each of the identified users. In this example, Steve (104A) and Carole (104B) are granted permissions to read the documents associated with the task 102 and given access to read posts of the relevant channel. In this example, based on the permissions read from the external resource data 110, Carole (104B) has Write permissions for each of the documents and permissions to write to the channel, and Steve (104A) has Write permissions to the second document and permissions to write to the channel.

Figure 6:
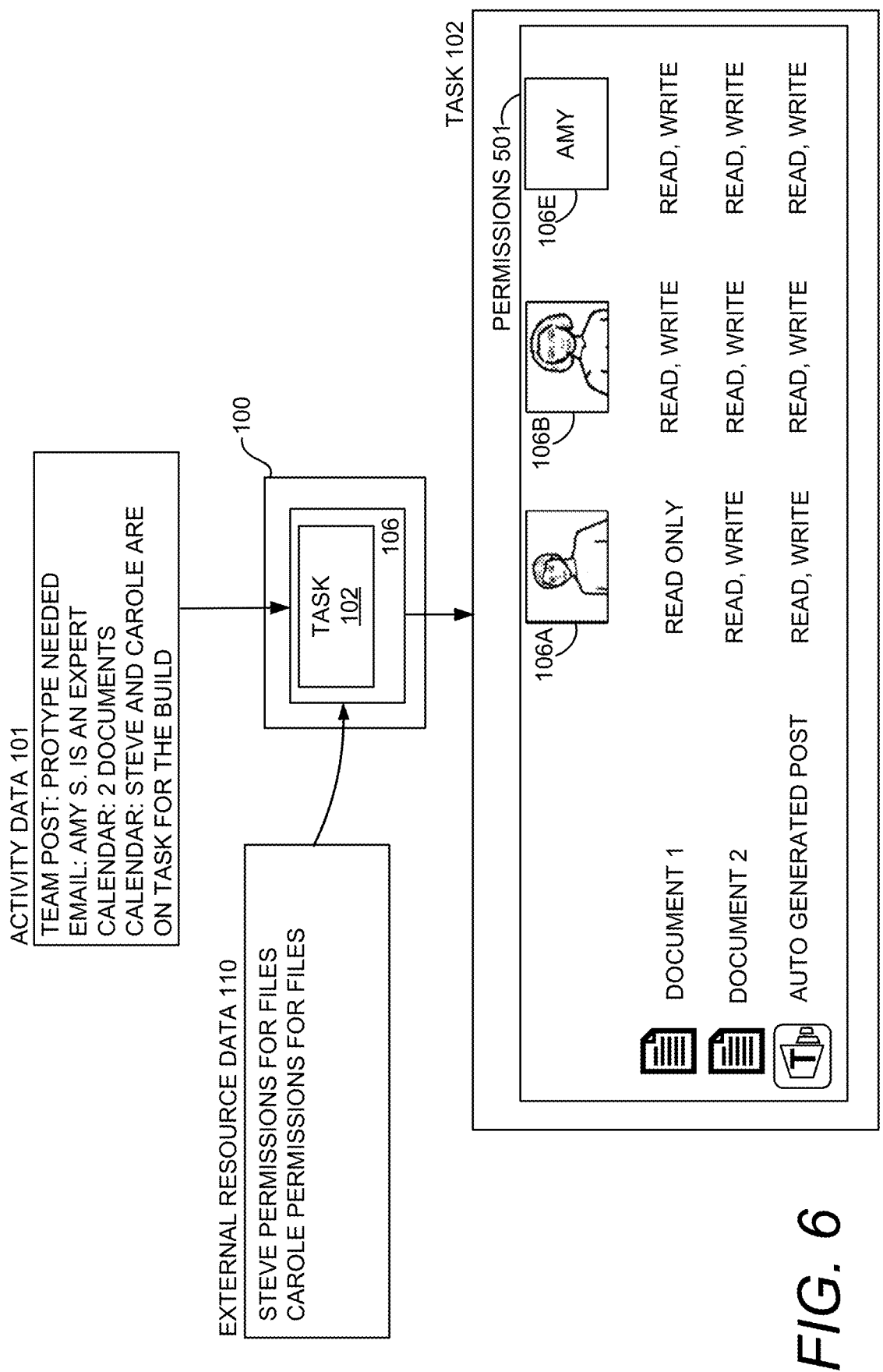
FIG. 6 illustrates an example where permissions may be modified for a particular user identity.

FIG. 6 is an extension of the example shown in FIG. 5. In this example, one user, Amy S., was not a participant in the user activity 101. However, Amy was identified as a person that is an expert that may be able to contribute to the task 102. In this scenario, when a person is referenced within the user activity 101, but was not a participant of the user activity 101, permissions may be generated for that person. This feature can enhance existing systems by automatically bringing relevant people into a project without the need for manual entry of permission data. In this example, Amy (106E) is added to the permissions 501 and is granted permissions that mirror one of the identities associated with the task 102. This example is provided for illustrative purposes and is not to be construed as limiting. It can be appreciated that permissions that are granted to an individual who was referenced within the user activity 101, but was not a participant of the user activity 101, may be based on a number of factors. For instance, such an individual may be granted read-only permissions until one or more users associated with the task performs one or more actions. For instance, permissions may be expanded in response to a particular communication with the individual, e.g., Carole has a threshold number of emails or other communications with Amy.

If an external resource does not provide permissions for a particular user, the permissions for a task assignee can be set based on a relationship between a user identifier and the task assignee. For instance, if Amy's permissions are not listed in the external resource data 110, the system can assign Amy's permissions based on his relationship with Carole and her assigned permissions. Permissions, e.g., Carole's permission, can be copied and assigned to Amy, or modified permissions, e.g., more relaxed permissions or more restricted permissions, can be granted to an assignee, such as Amy.

In some configurations, an expert in a particular technical area may be determined by the use of one or more external resources. For instance, social networks, address books, and other resources associated with the participants of the user activity 101 can be utilized to find an expert in a particular area. In one example, a social network associated with Carole (104B) can be searched for an expert, e.g., Amy S., using parameters of the task. For instance, the parameters of a task may include construction requirements, e.g., that a prototype must be made with a particular programming language or a particular material. And those parameters may be used to generate a query that may be used to search the external resources for the purposes of identifying a technical expert having a threshold level of experience. The system may rank a list of candidates that meet a threshold level of experience. For instance, a query may be looking for candidates having a certain number of degrees, years of experience, years of specific design experience, etc. User identities meeting such threshold levels of experience can be ranked based on the level of a match with the search criteria and displayed within a task 102.

To optimize the efficacy of each task 104, a selector 112 of the system 100 can identify a delivery mechanism 103 that can be used to communicate the task 102 to a user associated with the task 102. The delivery mechanisms 103 can include any system, platform, file, application, service, or any other computerized mechanism for communicating and displaying a task. Depending on when a person interacts with a computer, the type of interactions they have with a computer, the applications they may use, and the files they interact with, a task 102 may be delivered to any combination of delivery mechanisms 103. For instance, a task 102 may be embedded into a file, sent via text, sent via email, posted on a channel, delivered using an in-application ("in-app") message, delivered using an operating system notification feature, sent as a text message, etc. As will be described in more detail below, a task 102 may be configured to cause an application to display a task description and/or provide notifications of an associated deadline.

One or more delivery mechanisms 103 can be selected based on the preference data 107, the machine learning data 108, external resource data 110, and other contextual data. For example, if the preference data 107 and the machine learning data 108 indicate that a user spends more time viewing a word processing application rather than in a calendaring application, that user's task 102 may be sent directly to the word processing application for the display of the task 102 in an in-app message. In addition, or alternatively, if a user is working with a particular file but utilizes a number of different applications to access that file, a task 102 may be embedded within that file so that the task may be displayed regardless of the application that is utilized to access the file. Such an embodiment can also help with the authoring of any documentation that is related to the task 102.

FIG. 7 illustrates an example showing how the selector 112 of the system 100 utilizes a number of factors to select one more delivery mechanisms 103 for a task 102. Generally described, each factor can be scored according to a level of interaction with a user. The scores can be based on any scale. In one example, use frequency, a quantity of usage data, and a time of use of each delivery mechanism 103 are analyzed to select a delivery mechanism 103 for a task 102. This data can be obtained from machine learning data or general activity data that may be measured over time. The use frequency can indicate a number of times that a particular user accesses or uses a delivery mechanism over a period of time. For instance, if a spreadsheet application is used more frequently than a word processing application, the spreadsheet application may have a higher score than the word processing application.

The usage data can indicate a level of interaction a user may have with an application or file. For instance, if a user edits a first word document causing 5 KB of edits and then edits a second word document causing 200 MB of edits, the first word document may have a higher score than the second word document. Usage data can also apply to applications, for instance, if a user edits a collection of documents through an application, a data usage score can be generated for such an application.

The "time of use" can indicate how a time of use for a particular document or file may overlap with a time associated with the task 102. For instance, if a task is to be completed during a weekend and a recipient of a task uses a word processing application more than a presentation application on the weekends, the word processing application we have a higher score than the presentation application.

With respect to the example shown in FIG. 7, a number of delivery mechanisms 103 are scored and compared with one another. In this example, the scores 701 for each delivery mechanism 103 are processed to generate an accumulative score 702. Although this example illustrates that each score is summoned to create the accumulative score, it can be appreciated that any type of algorithm can be utilized to generate the accumulative score 702 based on the individual scores 701. In this example, the accumulative score 702 is compared to a threshold and the delivery mechanisms 103 that exceed the threshold are selected for use. If the system 100 determines that the selected mechanisms are not being used, the system 100 can utilize the ranked list and deliver tasks to various mechanisms 103 that did not exceed the threshold.

The data illustrated in the table of FIG. 7, is referred to herein as analytics data. Such data can be displayed to a user in a graphical user interface 701, thus allowing a user to understand how different delivery mechanisms are selected. A similar table may be illustrated for different topics that are selected from the user activity 101. In such an embodiment, a frequency of a particular keyword or a number of times the user activity 101 indicates a indicates a topic, may be displayed in a table such as the one shown in FIG. 7. By displaying such information, a user can understand how decisions are made within the system 100. In addition, the user can make one or more adjustments by selecting different factors, changing a weight that is applied to a factor, or allowing a user to make a manual selection. For instance, a user can select a particular delivery mechanism or change the ranking of the displayed delivery mechanisms. If a user selects a particular factor within the table shown in FIG. 7, the user can remove a specific factor, such as the "use frequency" factor. In response to such an input, a system can re-rank the delivery mechanisms and/or select a different set of delivery mechanisms using factors without considering the removed factors, e.g., the "use frequency" factor.

In some configurations, the system 100 can utilize a task delivery schedule with the selection of specific delivery mechanisms 103. Thus, tasks 102 can be delivered to a user at the right place at the right time, which may include a series of coordinated actions or messages for the purposes of increasing the usefulness and efficacy of the delivery of the task 102.

Figure 8:
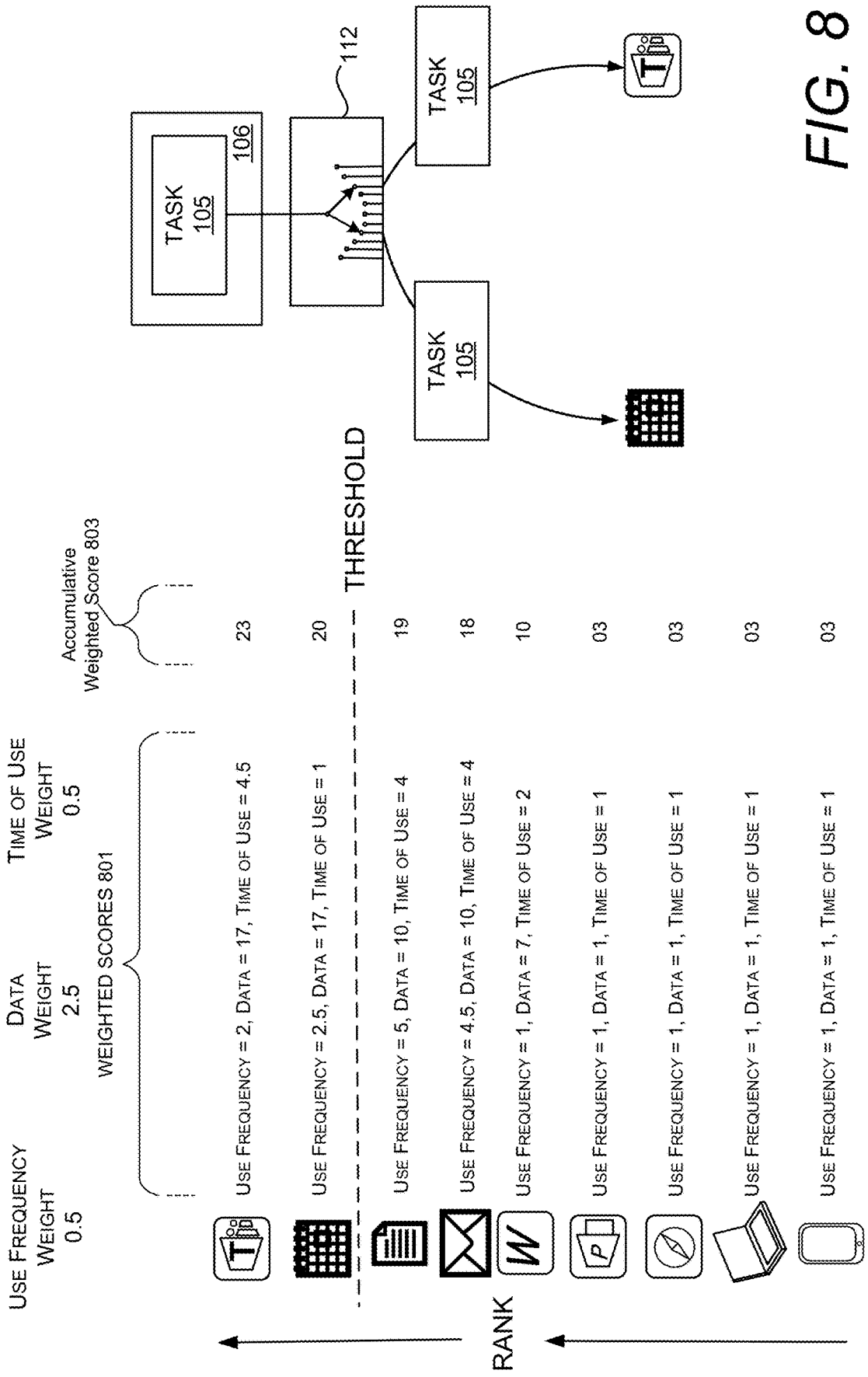
FIG. 8 illustrates an example scenario where a number of weighted scores can be used to score factors that are used to select one more delivery mechanisms.

In some configurations, the scores for each delivery mechanism 103 can be normalized or weighted. FIG. 8 illustrates an example that is an extension of the example shown in FIG. 7. In this example, a number of weights are applied to each score 701 to generate a weighted score 801. The weighted scores are used to generate an accumulative weighted score 803. The weights that are applied to each score can be based on a number of resources including but not limited to definitions within the user preference data, machine learning data, or the activity data.

In one illustrative example, if the system 100 determines that a user is not interacting with a task at a particular delivery option, e.g., the recipient of a task is not reading emails associated with the task, the system may reduce any score that was used to select that delivery option. For instance, the examples shown in FIG. 7 and FIG. 8, the use frequency weight and the time of use weight may reduce the related scores of the email system if the system 100 determines that the user is not reading or utilizing that delivery option. As shown in the figures, the email system is selected as a delivery mechanism in FIG. 7 but is later removed as an option in FIG. 8. This may result in the system 100 determining that a particular system, such as the email system, is not being utilized or is not effective for delivering a task.

The weights that are applied to different factors can come from a number of different resources. For instance, the weights can be generated by a machine learning system that can measure how much a particular delivery mechanism is being used. Thus, if the machine learning system determines that a particular delivery mechanism, such as an email application, is often selected but not actually used by a person, the system can eliminate the factors that are used to select such a delivery mechanism or the system can apply a particular weight, e.g., less than 1, to such factors. In another example, the weights that are applied to different factors can come from a user input. This enables a user to make real-time adjustments to the decision-making process after looking at the analytics and enabling them to understand how a delivery mechanism is selected.

As summarized above, the delivery mechanisms can involve a number of different types of user interfaces, applications, and other forms of data that can communicate a task. FIGS. 9A-9G illustrate a number of example user interfaces that can be utilized with the techniques disclosed herein.

Figure 9A:
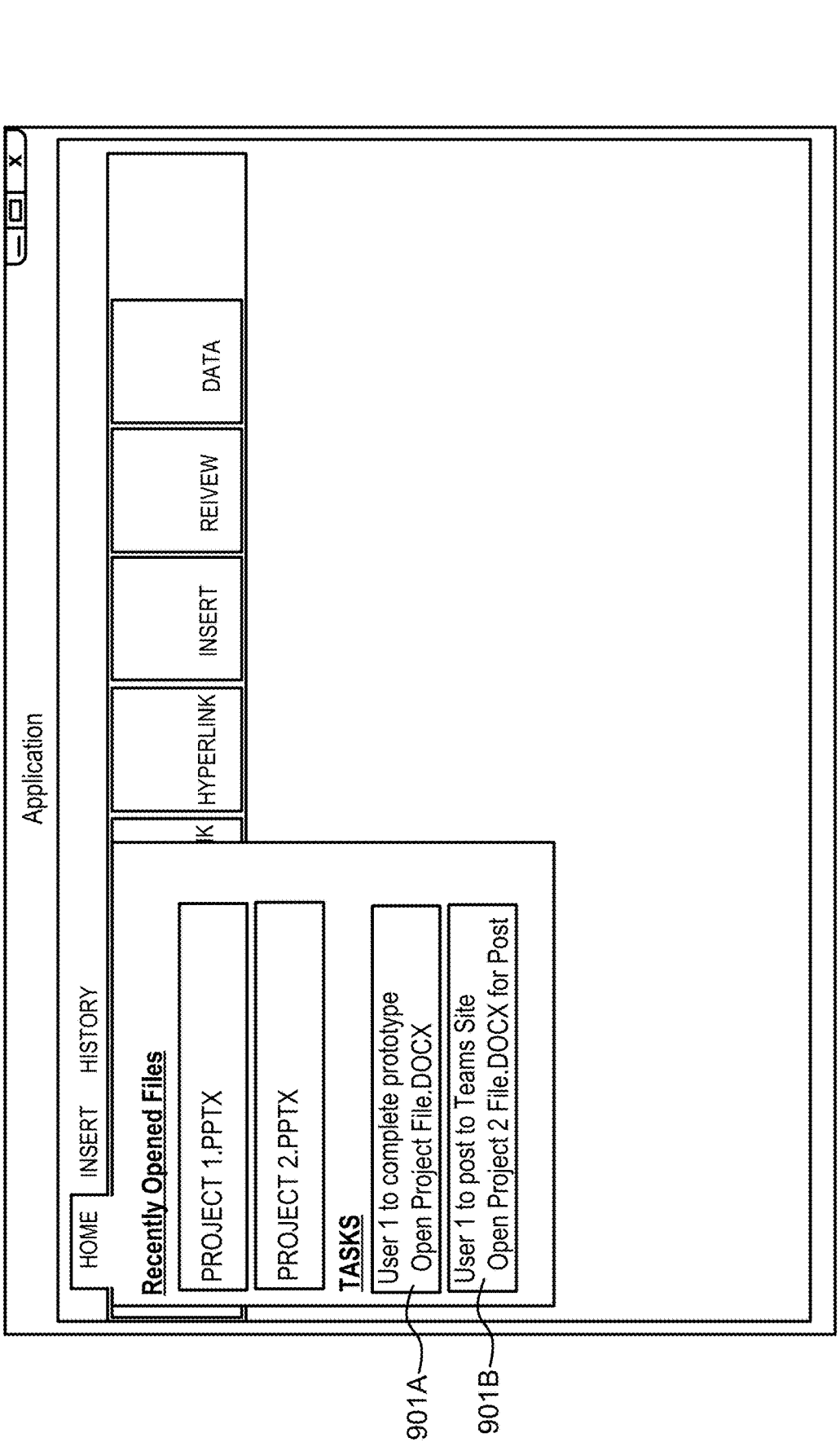
FIG. 9A illustrates an example of how a user interface of an application can be modified to convey a task to a recipient using an in-app message.

FIG. 9A illustrates an example of how a user interface 900 of an application can be modified to convey a task to a recipient using an in-app message. In this example, the task is displayed in a location that is strategically placed when the user is ready to start a project, e.g., when they are opening a file. In this example, a task description and links to two files (901A and 901B) are provided within a user interface menu normally used to open files.

Figure 9B:
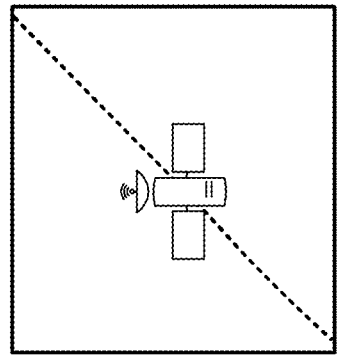
FIG. 9B illustrates an example of how a user interface of an application can be modified to convey a task to a recipient using an in-app message.

FIG. 9B illustrates another example of how a user interface 901 can be modified with an in-app message 903. In this example, the task is embedded in a location that is in close proximity, e.g., adjacent, to the content the recipient is working on. In some configurations, the in-app message 903 can also include a link 904 that can navigate the user to a source of the task, e.g., a channel, a Skype call to a recorded or live meeting, etc.

Figure 9C:
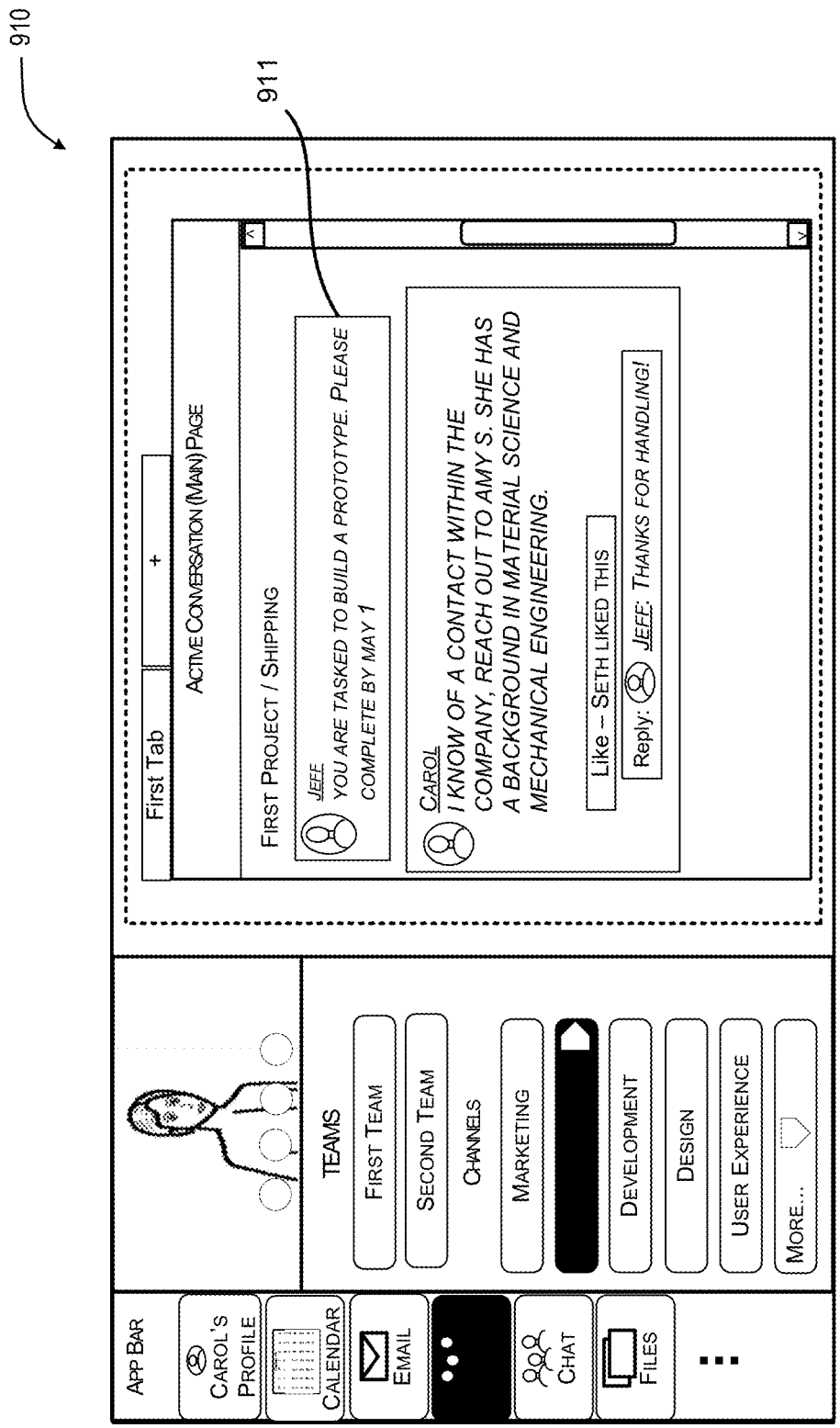
FIG. 9C illustrates an example of how a task can be delivered to a recipient by the use of a channel application.
Figure 9D:
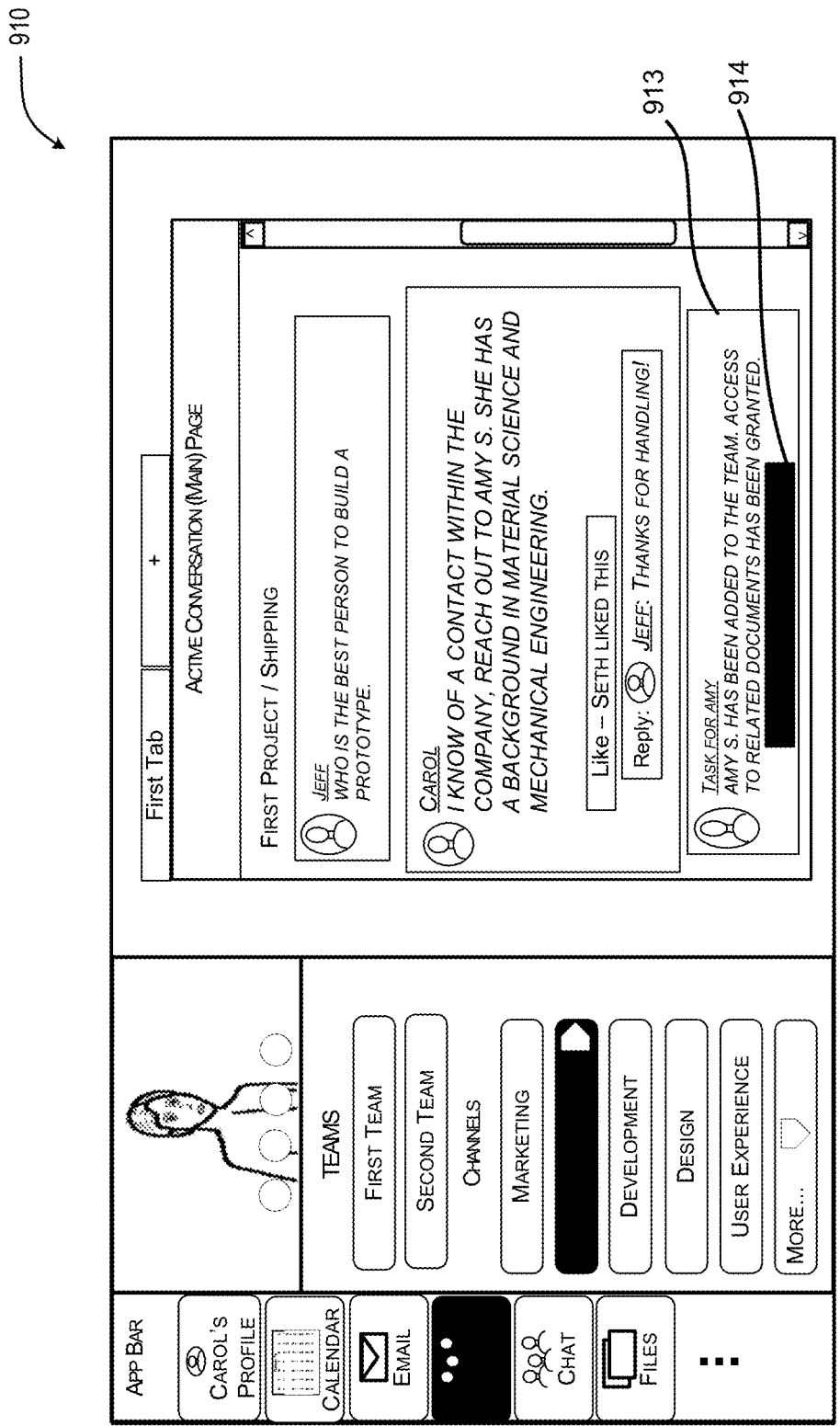
FIG. 9D illustrates an example of how a task and a related file can be delivered to a recipient by the use of a channel application.

FIG. 9C illustrates another example of how a task can be delivered to a recipient by the use of a channel application. In this example, a user interface 910 of a channel is populated with a post 911 indicating that an individual is tasked to build a prototype. FIG. 9D illustrates yet another example involving a channel application. In this example, a user interface 910 of a channel is populated with a post 913 indicating that an individual is tasked to build a prototype. This channel entry also involves a link 914 to a supporting document. Such channel entries can be automatically generated by the system 100 based on the selection of such delivery mechanisms and based on a delivery schedule.

FIG. 9E illustrates an example of a channel entry that may be utilized to convey a task for a particular recipient, Amy. In this example, a recipient's task includes a task timeline. The task timeline indicates that the timeline conflicts with one of Amy's meetings. The user interface 910 also illustrates a task of another user, Bob, that depends on Amy's task. Dependent tasks may be displayed to a user when a conflict is detected. Such information enables the user to make a decision about the conflict and how the conflict may impact others.

When the system determines that a particular event, such as a meeting, conflicts with a task timeline, the system 100 can generate a graphical element 950 indicating the presence of a conflict. The graphical element 950 can also provide information describing the event or the severity of the conflict. The graphical element 950 may also indicate a priority with respect to the event that conflicts with the timeline. Based on the priority of the meeting, the system 100 can take one or more actions. For instance, if the event that presents the conflict is low priority, such as a general team meeting, the system may generate a second graphical element 951 for allowing the user to resolve the conflict. In response to a user selection of the second graphical element 951, the system 100 may remove the event causing the conflict, reschedule the event causing the conflict, or prompt the user to manually move the event causing the conflict.

Figure 9F:
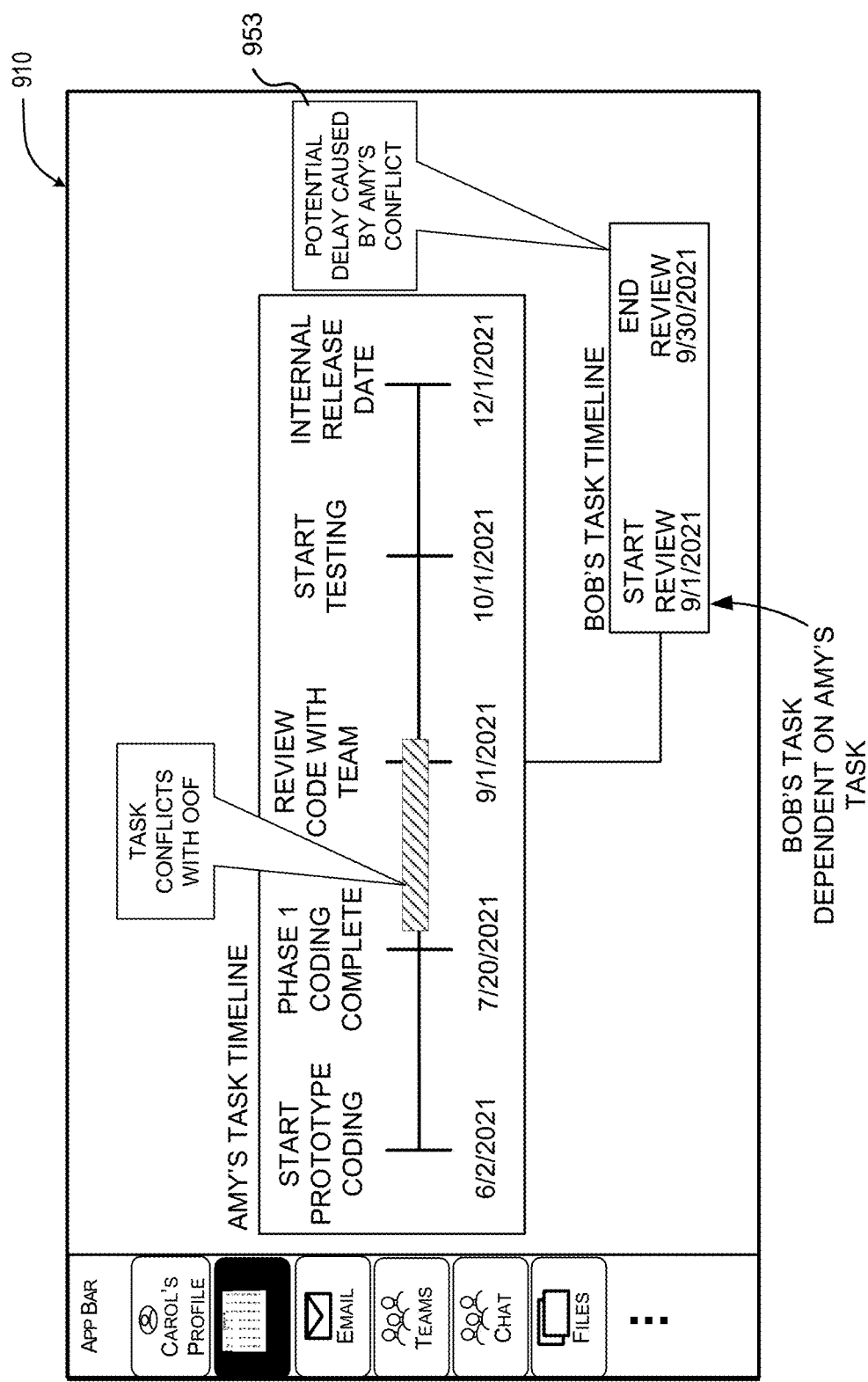
FIG. 9F illustrates an example of a graphical user interface showing a task timeline and a dependent task timeline.

With reference to FIG. 9F, in continuing the above example, if the system determines that the event that conflicts with the timeline is of high priority, such as a CEO meeting or a vacation, the system 100 may automatically generate a notification to other users associated with dependent tasks. In addition, the system 100 may generate a graphical element 953 that is displayed to the task owner, Amy, indicating the type of message that may be displayed to the users associated with the dependent task, such as Bob.

FIG. 9G illustrates an example user interface 910 that may be displayed to the users associated with dependent tasks. In this case, a user interface that is displaying Bob's task may show a graphical element 953 that notifies the task owner that there may be a delay or conflict, such as the conflict discovered with respect to Amy's task.

Figure 10:
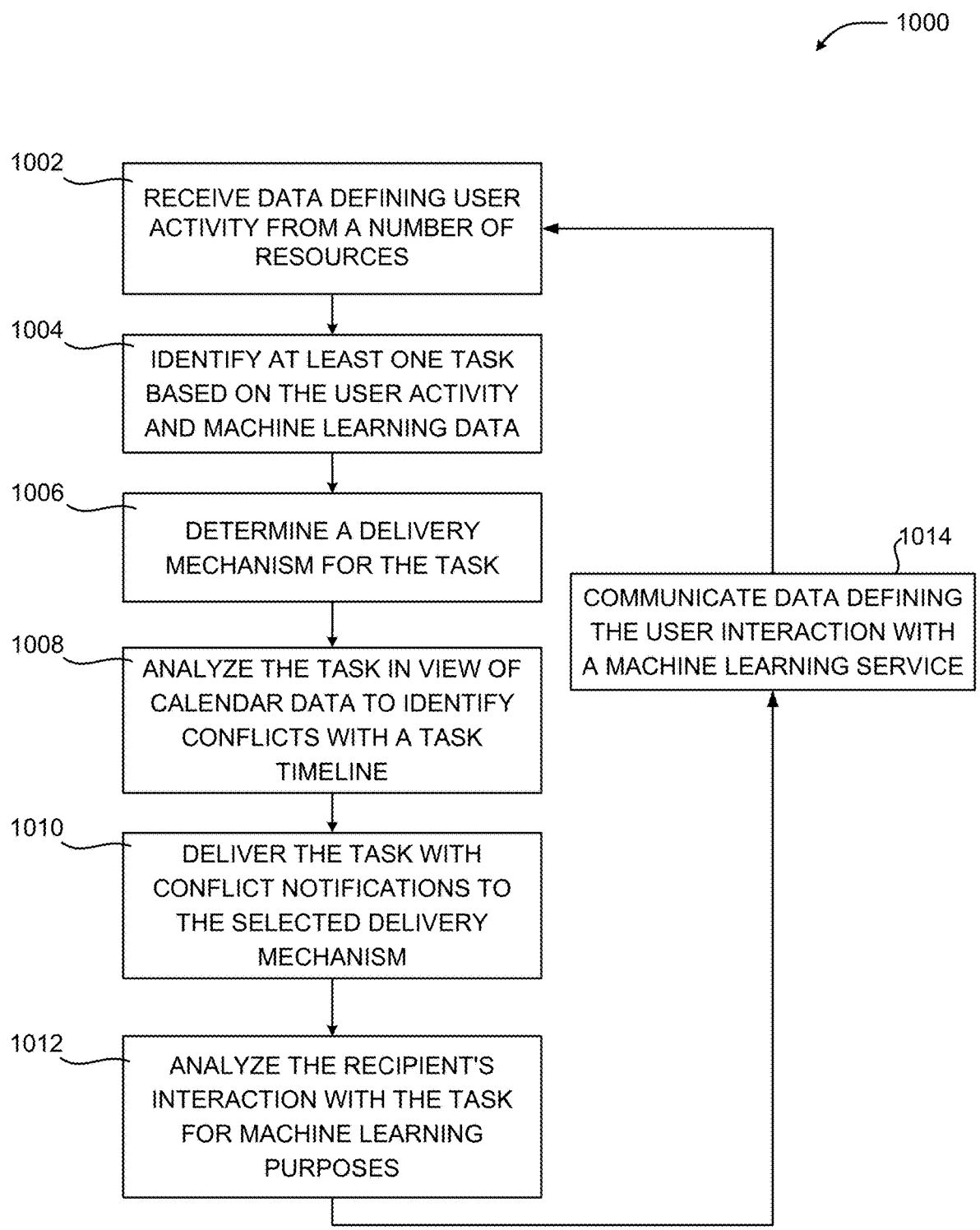
FIG. 10 is a flow diagram illustrating aspects of a routine for computationally efficient generation and management of tasks.

FIG. 10 is a diagram illustrating aspects of a routine 1000 for computationally efficient generation and management of tasks. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 10 and the other FIGURES can be implemented in association with the example presentation UIs described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, chat sessions, video streams, images, virtual objects, and/or applications associated with a communication session.

The routine 1000 starts at operation 1002, where the system 100 receives data defining user activity from a number of resources. In this operation, communication data and/or files that are part of the user activity of a number of individuals can be collected for the purposes of identifying keywords, descriptions or parameters. For instance, the system can identify a phrase within a conversation and associate that conversation with other forms of communication such as a chat entry. The system can analyze files that are associated with any suitable type of user activity. For instance, if a user is editing a spreadsheet or a Word document, the content of such documents can be received and analyzed. Files that are attached to other types of communication, such as a channel entry, can also be received and analyzed. Operation 1002 can include the receipt of any type of communication data including but not limited to emails, messages, video and recordings, and live broadcasts, etc.

The routine 1000 proceeds to operation 1004, where the system 100 identifies at least one task based on the received data defining user activity and/or machine learning data. Operation 1004 can include any suitable technology for analyzing keywords, phrases, images, or any other type of data to identify a task. Any aspect of a task can be determined at operation 1004. For instance, user identities, files, a task timeline, a task description, a task delivery schedule, and other activities can be determined. For instance, text data or audio data may include the phrase such as, "it would be helpful for Jason to build a prototype of the software application. It would also be helpful for the software application to have a boot time that is less than 30 seconds." In this example, the system 100 can identify at least one identity, e.g., Jason, and at least one parameter, e.g., that the boot time needs to be less than 30 seconds." The timeline with respect to this task may be indicated in the communication or the timeline may be derived from other information. For instance, the system indicates that the software application being discussed has a release schedule within the next three months and that prototypes are due in two months. From such information, the system may combine the attributes, such as the timeline, user identity, and task description to generate a task.

Next, at operation 1006, the system 100 can determine a delivery mechanism for the task. As described herein, one or more factors can be utilized to determine the appropriate delivery mechanism. The factors can be based on, but not limited to, machine learning data, activity data, preferences, and contextual data received from external resources such as address books, social networks, etc.

At operation 1008, the system 100 can analyze the task in view of one or more external resources, such as calendar data, to identify conflicts with a task timeline. For instance, if a task timeline indicates that a user needs to complete a prototype within a certain week, and that user is scheduled to be out of town during that time, the system 100 can identify a conflict between the task timeline and one or more events.

Next, at operation 1010, the system 100 can deliver the task with one of more conflict notifications to a selected delivery mechanism. As described above, the delivery mechanism can include any suitable platform, software application, or file, that is selected based on the user's interaction with a computer. As mentioned above, the system 100 can provide a notification indicating a scheduling conflict. The system 100 can also provide tools for allowing a user to resolve conflicts. Based on a priority associated with an event that conflicts with a task timeline, the system can allow a user to reschedule the event, delete the event, or otherwise modify the event to mitigate the conflict. The system 100 may also notify other users that may be impacted by the conflict.

Next, at operation 1012, the system can analyze the user activity of a person receiving a generated task, e.g., a recipient, for the purposes of collecting and analyzing machine learning data. For instance, when a particular user receives a generated task, and that user does not interact with the task, the system 100 can analyze that type of activity and make real-time adjustments to ensure that the user receives the notification of the task. At the same time, the system 100 may also measure a level of activity with respect to a user's interaction with the task. This data can be collected and utilized for determining future delivery mechanisms for tasks. For instance, if a person responds with one or more user activities after reading an email describing a task, the system updates scores and other metrics that may be used to decide the delivery mechanism for future tasks. In this example, if a user reacts, e.g., makes any measurable progress with a task after reading an email, an email system may be scored higher as a delivery mechanism than other delivery mechanisms that were not used, such as chat messages, etc.

Next, at operation 1014, the system 100 can communicate the data defining the user interaction with the machine learning service. A machine learning service may involve an external service or an internal service within the system 100. Different metrics, examples of which are shown in FIG. 7 and FIG. 8, can be stored and analyzed for the delivery of tasks. As shown, the routine 1000 can proceed from operation 1014 back to operation 1002 to enable the system 100 to continually utilize and adjust the machine learning data as new tasks are generated.

In addition to, or in conjunction with, the routine 1000, a computer-readable medium may cause a system 100 to monitor input data defining user activity of a plurality of users for identifying keywords from the user activity associated with at least one of a document, a message, a channel thread, an audio recording, or a communication stream. The system may then analyze keywords to identify a task and at least one user identity associated with the task, and then generate a task description based on the keywords. The system may also analyze machine learning data defining user activity associated with the at least one user identity associated with the task. In some embodiments, the machine learning data may indicate a frequency of use of a number of delivery applications and/or a number of delivery files. For instance, if a user interacts with a file using several applications, the system may embed or link aspects of the task within the file instead of providing an in-app message within a software application. Thus, the system can communicate the task description to at least one delivery software application of the number of delivery software applications having a threshold level of use, wherein the communication causes the at least one delivery software application to display the task description in a user interface. Alternatively, or in addition, the system can embed the task description in at least one delivery file of the number of delivery files having the threshold level of use.

In some embodiments, the system can analyze keywords to identify a task that further comprises analyzing the keywords to then identify a task timeline associated with the task. The system can communicate the task timeline to the at least one delivery software application having the threshold level of use, wherein the communication causes the at least one delivery software application to display the task timeline in the user interface. The system can also embed the task timeline in the at least one delivery file having the threshold level of use.

In some embodiments, the system can identify related files and deliver the related files concurrently with the task. For instance, the system can analyze at least one of a document, message, channel thread, audio recording, and/or a communication stream to identify a file associated with the task. For instance, the system can communicate the file or an identifier for the file to the at least one delivery software application having the threshold level of use, wherein the communication causes the at least one delivery software application to display at least a portion of the file or the identifier for the file in the user interface. The system can also embed at least a portion of the file or the identifier for the file in the at least one delivery file having the threshold level of use.

In some embodiments, the system can control permissions for files associated with a task. For instance, a system can determine access permissions associated with the file based on the at least one user identity. With reference to some of the examples described above, if Steve is selected as a person assigned to a task, the system can assign access permissions to at least a portion of the file embedded in a delivery file, or any other delivery mechanism 103. In some embodiments, the system may determine access permissions associated with the file based on the at least one user identity, e.g., Bob's permissions, and assign the access permissions to the file communicated to the at least one delivery software application, e.g. to the application shown in FIG. 9A.

In some configurations, the system may determine a delivery schedule for the task for the software application. For instance, a system may analyze machine learning data defining user activity associated with the at least one user identity associated with the task, wherein the machine learning data indicates a time of use of the at least one delivery software application. Based on such an analysis, the system can communicate the file or the identifier for the file to the at least one delivery software application based on time of use of the at least one delivery software application.

In some configurations, the system may determine a delivery schedule for the task for the delivery file. For instance, the system can analyze machine learning data defining user activity associated with the at least one user identity associated with the task, wherein the machine learning data indicates a time of use of the at least one delivery file. The system can then embed the task description or any other task attribute in the at least one delivery file (e.g. 103 of FIG. 1) based on the time of use of the at least one delivery file.

In some configurations, the system can deliver a task to an operating system to allow the operating system to provide a system notification when the applications are not being used at a threshold level. For instance, a system may determine that the delivery software applications do not meet the threshold level of use. In response to determining that the delivery software applications do not meet the threshold level of use, the system may cause the task description to be displayed in an operating system notification, wherein the operating system notification is displayed according to a delivery schedule based on the machine learning data. As described herein, the system can provide a task using any suitable delivery mechanism including, but not limited to, a text message application, a word processing application, a spreadsheet application, a presentation editing application, a channel communication application, a video and audio communication application, or a calendaring application.

In some configurations, the system can identify experts related to a task. In conjunction with any of the techniques disclosed herein, the system can analyze the task description to identify required credentials associated with the task. The system can then generate a query comprising a description of the required credentials associated with the task. The system can then communicate the query to at least one external resource for causing the external resource to identify one or more user identities having a threshold level of credentials with respect to the required credentials associated with the task. In one illustrative example, the query can be sent to a social network, such as LinkedIn, and analyze any data related to a person. The person's credentials can be matched against any criteria generated by the system to determine if the person meets a threshold level of experience, e.g., a predetermined number of certificates, degrees, or achievements, for a particular task. The system can then receive resource data in response to the query. The resource data can identify the one or more user identities having the threshold level of credentials with respect to the required credentials associated with the task. The system can then generate access permissions for at least one computing device for allowing the one or more user identities having the threshold level of credentials to access task data defining the task description, a task timeline, and/or at least one file associated with the task.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 11:
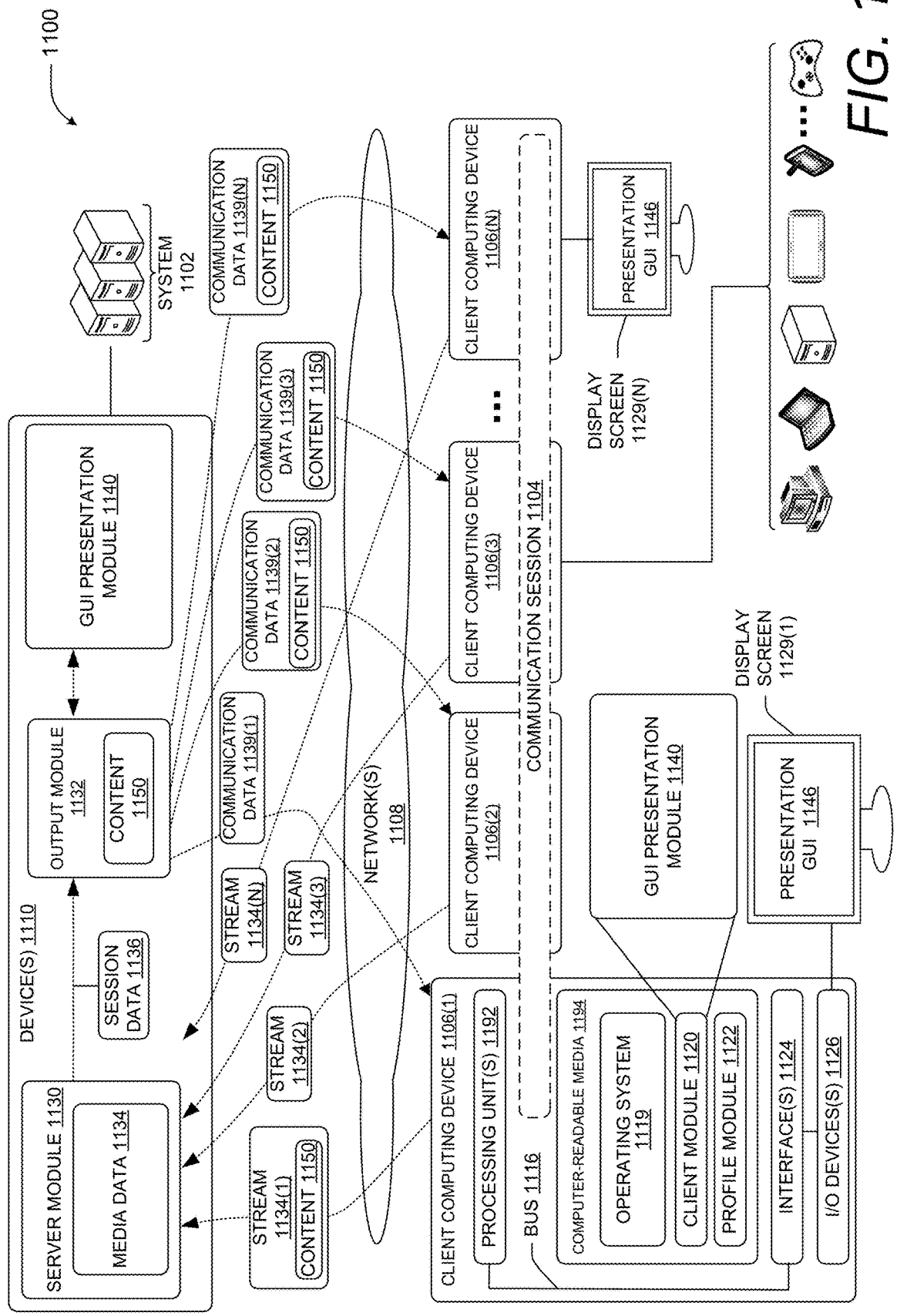
FIG. 11 is a computing system diagram showing aspects of an illustrative operating environment for the technologies disclosed herein.

FIG. 11 is a diagram illustrating an example environment 1100 in which a system 1102 can implement the techniques disclosed herein. In some implementations, a system 1102 may function to collect, analyze, and share data defining one or more objects that are displayed to users of a communication session 1004.

As illustrated, the communication session 1104 may be implemented between a number of client computing devices 1106(1) through 1106(N) (where N is a number having a value of two or greater) that are associated with or are part of the system 1102. The client computing devices 1106(1) through 1106(N) enable users, also referred to as individuals, to participate in the communication session 1104.

In this example, the communication session 1104 is hosted, over one or more network(s) 1108, by the system 1102. That is, the system 1102 can provide a service that enables users of the client computing devices 1106(1) through 1106(N) to participate in the communication session 1104 (e.g., via a live viewing and/or a recorded viewing). Consequently, a "participant" to the communication session 1104 can comprise a user and/or a client computing device (e.g., multiple users may be in a room participating in a communication session via the use of a single client computing device), each of which can communicate with other participants. As an alternative, the communication session 1104 can be hosted by one of the client computing devices 1106(1) through 1106(N) utilizing peer-to-peer technologies. The system 1102 can also host chat conversations and other team collaboration functionality (e.g., as part of an application suite).

In some implementations, such chat conversations and other team collaboration functionality are considered external communication sessions distinct from the communication session 1104. A computing system 1102 that collects participant data in the communication session 1104 may be able to link to such external communication sessions. Therefore, the system may receive information, such as date, time, session particulars, and the like, that enables connectivity to such external communication sessions. In one example, a chat conversation can be conducted in accordance with the communication session 1104. Additionally, the system 1102 may host the communication session 1104, which includes at least a plurality of participants co-located at a meeting location, such as a meeting room or auditorium, or located in disparate locations.

In examples described herein, client computing devices 1106(1) through 1106(N) participating in the communication session 1104 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 1104 live as activity occurs, or alternatively, via a recording at a later time after the activity occurs. In examples described herein, client computing devices 1106(1) through 1106(N) participating in the communication session 1104 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 1102 of FIG. 11 includes device(s) 1110. The device(s) 1110 and/or other components of the system 1102 can include distributed computing resources that communicate with one another and/or with the client computing devices 1106(1) through 1106(N) via the one or more network(s) 1108. In some examples, the system 1102 may be an independent system that is tasked with managing aspects of one or more communication sessions such as communication session 1104. As an example, the system 1102 may be managed by entities such as SLACK, WEBEX, GOTOMEETING, GOOGLE HANGOUTS, etc.

Network(s) 1108 may include, for example, public networks such as the Internet, private networks such as an institutional and/or personal intranet, or some combination of private and public networks. Network(s) 1108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 1108 may utilize communications protocols, including packet-based and/or datagram-based protocols such as Internet protocol ("IP"), transmission control protocol ("TCP"), user datagram protocol ("UDP"), or other types of protocols. Moreover, network(s) 1108 may also include a number of devices that facilitate network communications and/or form a hardware basis for the networks, such as switches, routers, gateways, access points, firewalls, base stations, repeaters, backbone devices, and the like.

In some examples, network(s) 1108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 1110 may include one or more computing devices that operate in a cluster or other grouped configuration to share resources, balance load, increase performance, provide fail-over support or redundancy, or for other purposes. For instance, device(s) 1110 may belong to a variety of classes of devices such as traditional server-type devices, desktop computer-type devices, and/or mobile-type devices. Thus, although illustrated as a single type of device or a server-type device, device(s) 1110 may include a diverse variety of device types and are not limited to a particular type of device. Device(s) 1110 may represent, but are not limited to, server computers, desktop computers, web-server computers, personal computers, mobile computers, laptop computers, tablet computers, or any other sort of computing device.

A client computing device (e.g., one of client computing device(s) 1106(1) through 1106(N)) (each of which are also referred to herein as a "data processing system") may belong to a variety of classes of devices, which may be the same as, or different from, device(s) 1110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 1106(1) through 1106(N) of the various classes and device types can represent any type of computing device having one or more data processing unit(s) 1192 operably connected to computer-readable media 1194 such as via a bus 1116, which in some instances can include one or more of a system bus, a data bus, an address bus, a PCI bus, a Mini-PCI bus, and any variety of local, peripheral, and/or independent buses.

Executable instructions stored on computer-readable media 1194 may include, for example, an operating system 1119, a client module 1120, a profile module 1122, and other modules, programs, or applications that are loadable and executable by data processing units(s) 1192.

Client computing device(s) 1106(1) through 1106(N) may also include one or more interface(s) 1124 to enable communications between client computing device(s) 1106(1) through 1106(N) and other networked devices, such as device(s) 1110, over network(s) 1108. Such network interface(s) 1124 may include one or more network interface controllers (NICs) or other types of transceiver devices to send and receive communications and/or data over a network. Moreover, client computing device(s) 1106(1) through 1106(N) can include input/output ("I/O") interfaces (devices) 1126 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 11 illustrates that client computing device 1106(1) is in some way connected to a display device (e.g., a display screen 1129(N)), which can display a UI according to the techniques described herein.

In the example environment 1100 of FIG. 11, client computing devices 1106(1) through 1106(N) may use their respective client modules 1120 to connect with one another and/or other external device(s) in order to participate in the communication session 1104, or in order to contribute activity to a collaboration environment. For instance, a first user may utilize a client computing device 1106(1) to communicate with a second user of another client computing device 1106(2). When executing client modules 1120, the users may share data, which may cause the client computing device 1106(1) to connect to the system 1102 and/or the other client computing devices 1106(2) through 1106(N) over the network(s) 1108.

The client computing device(s) 1106(1) through 1106(N) may use their respective profile modules 1122 to generate participant profiles (not shown in FIG. 11) and provide the participant profiles to other client computing devices and/or to the device(s) 1110 of the system 1102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 11, the device(s) 1110 of the system 1102 include a server module 1130 and an output module 1132. In this example, the server module 1130 is configured to receive, from individual client computing devices such as client computing devices 1106(1) through 1106(N), media streams 1134(1) through 1134(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 1130 is configured to receive a collection of various media streams 1134(1) through 1134 (N) during a live viewing of the communication session 1104 (the collection being referred to herein as "media data 1134"). In some scenarios, not all of the client computing devices that participate in the communication session 1104 provide a media stream. For example, a client computing device may only be a consuming, or a "listening", device such that it only receives content associated with the communication session 1104 but does not provide any content to the communication session 1104.

In various examples, the server module 1130 can select aspects of the media streams 1134 that are to be shared with individual ones of the participating client computing devices 1106(1) through 1106(N). Consequently, the server module 1130 may be configured to generate session data 1136 based on the streams 1134 and/or pass the session data 1136 to the output module 1132. Then, the output module 1132 may communicate communication data 1139 to the client computing devices (e.g., client computing devices 1106(1) through 1106(3) participating in a live viewing of the communication session). The communication data 1139 may include video, audio, and/or other content data, provided by the output module 1132 based on content 1150 associated with the output module 1132 and based on received session data 1136.

As shown, the output module 1132 transmits communication data 1139(1) to client computing device 1106(1), and transmits communication data 1139(2) to client computing device 1106(2), and transmits communication data 1139(3) to client computing device 1106(3), etc. The communication data 1139 transmitted to the client computing devices can be the same or can be different (e.g., positioning of streams of content within a user interface may vary from one device to the next).

In various implementations, the device(s) 1110 and/or the client module 1120 can include GUI presentation module 1140. The GUI presentation module 1140 may be configured to analyze communication data 1139 that is for delivery to one or more of the client computing devices 1106. Specifically, the UI presentation module 1140, at the device(s) 1110 and/or the client computing device 1106, may analyze communication data 1139 to determine an appropriate manner for displaying video, image, and/or content on the display screen 1129 of an associated client computing device 1106. In some implementations, the GUI presentation module 1140 may provide video, image, and/or content to a presentation GUI 1146 rendered on the display screen 1129 of the associated client computing device 1106. The presentation GUI 1146 may be caused to be rendered on the display screen 1129 by the GUI presentation module 1140. The presentation GUI 1146 may include the video, image, and/or content analyzed by the GUI presentation module 1140.

In some implementations, the presentation GUI 1146 may include a plurality of sections or grids that may render or comprise video, image, and/or content for display on the display screen 1129. For example, a first section of the presentation GUI 1146 may include a video feed of a presenter or individual, a second section of the presentation GUI 1146 may include a video feed of an individual consuming meeting information provided by the presenter or individual. The GUI presentation module 1140 may populate the first and second sections of the presentation GUI 1146 in a manner that properly imitates an environment experience that the presenter and the individual may be sharing.

In some implementations, the GUI presentation module 1140 may enlarge or provide a zoomed view of the individual represented by the video feed in order to highlight a reaction, such as a facial feature, the individual had to the presenter. In some implementations, the presentation GUI 1146 may include a video feed of a plurality of participants associated with a meeting, such as a general communication session. In other implementations, the presentation GUI 1146 may be associated with a channel, such as a chat channel, enterprise teams channel, or the like. Therefore, the presentation GUI 1146 may be associated with an external communication session that is different than the general communication session.

Figure 12:
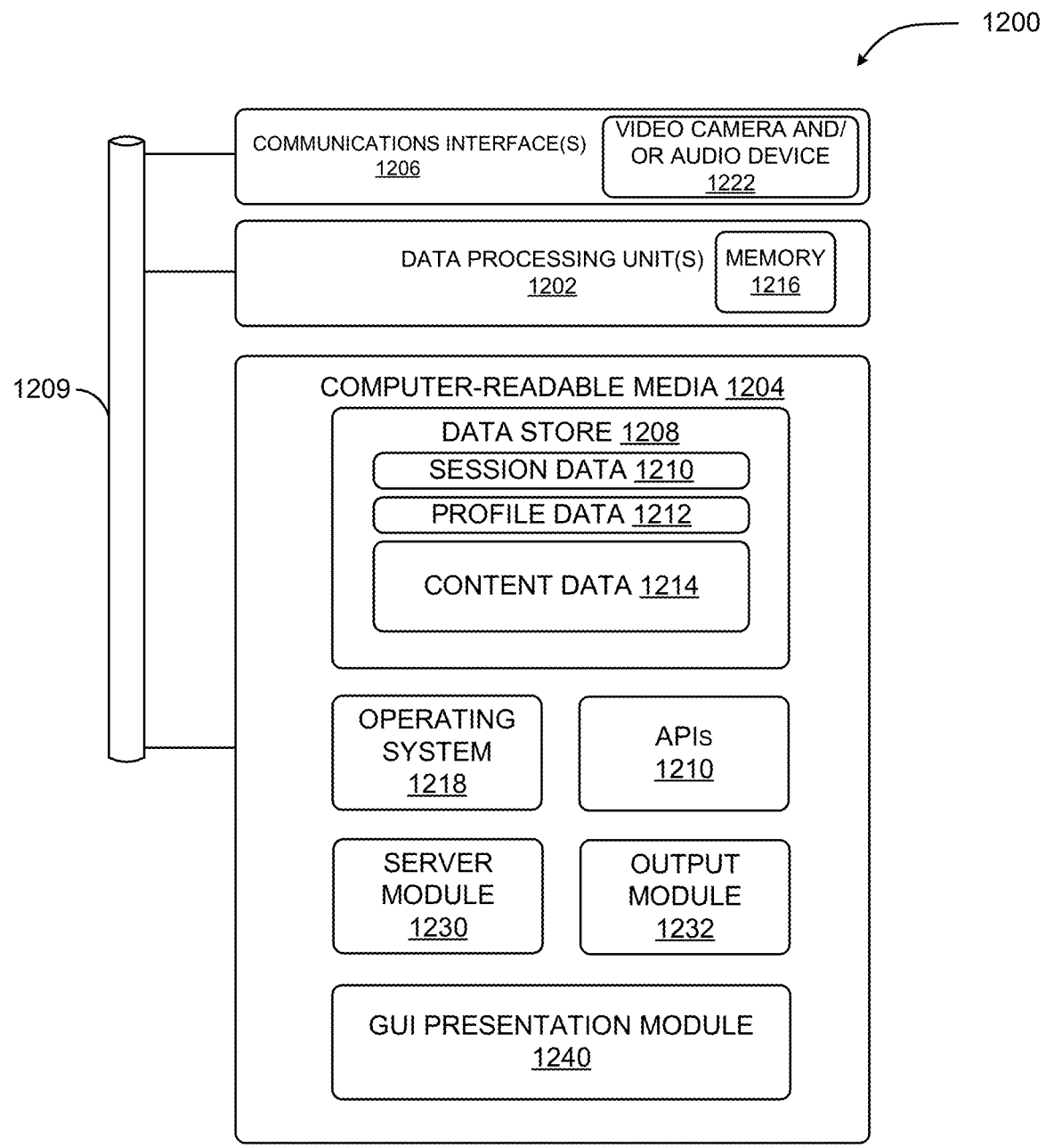
FIG. 12 is a computing architecture diagram showing aspects of the configuration and operation of a computing device that can implement aspects of the technologies disclosed herein.

FIG. 12 illustrates a diagram that shows example components of an example device 1200 (also referred to herein as a "computing device") configured to generate data for some of the user interfaces disclosed herein. The device 1200 may generate data that may include one or more sections that may render or comprise video, images, virtual objects, and/or content for display on the display screen 1129. The device 1200 may represent one of the device(s) described herein. Additionally, or alternatively, the device 1200 may represent one of the client computing devices 1106.

As illustrated, the device 1200 includes one or more data processing unit(s) 1202, computer-readable media 1204, and communication interface(s) 1206. The components of the device 1200 are operatively connected, for example, via a bus 1209, which may include one or more of a system bus, a data bus, an address bus, a PCI bus, a Mini-PCI bus, and any variety of local, peripheral, and/or independent buses.

As utilized herein, data processing unit(s), such as the data processing unit(s) 1202 and/or data processing unit(s) 1192, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 1204 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 1206 may represent, for example, network interface controllers ("NICs") or other types of transceiver devices to send and receive communications over a network. Furthermore, the communication interface(s) 1206 may include one or more video cameras and/or audio devices 1222 to enable generation of video feeds and/or still images, and so forth.

In the illustrated example, computer-readable media 1204 includes a data store 1208. In some examples, the data store 1208 includes data storage such as a database, data warehouse, or other type of structured or unstructured data storage. In some examples, the data store 1208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 1208 may store data for the operations of processes, applications, components, and/or modules stored in computer-readable media 1204 and/or executed by data processing unit(s) 1202 and/or accelerator(s). For instance, in some examples, the data store 1208 may store session data 1210 (e.g., session data 1136 as shown in FIG. 11), profile data 1212 (e.g., associated with a participant profile), and/or other data. The session data 1210 can include a total number of participants (e.g., users and/or client computing devices) in a communication session, activity that occurs in the communication session, a list of invitees to the communication session, and/or other data related to when and how the communication session is conducted or hosted. The data store 1208 may also include content data 1214, such as the content that includes video, audio, or other content for rendering and display on one or more of the display screens 1129.

Alternately, some or all of the above-referenced data can be stored on separate memories 1216 on board one or more data processing unit(s) 1202 such as a memory on board a CPU-type processor, a GPU-type processor, an FPGA-type accelerator, a DSP-type accelerator, and/or another accelerator. In this example, the computer-readable media 1204 also includes an operating system 1218 and application programming interface(s) 1210 (APIs) configured to expose the functionality and the data of the device 1200 to other devices. Additionally, the computer-readable media 1204 includes one or more modules such as the server module 1230, the output module 1232, and the GUI presentation module 1240, although the number of illustrated modules is just an example, and the number may vary higher or lower. That is, functionality described herein in association with the illustrated modules may be performed by a fewer number of modules or a larger number of modules on one device or spread across multiple devices.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for improving the efficiency of a data processing system, the method comprising:
    monitoring, by the data processing system, input data defining user activity of a plurality of users for identifying keywords from the user activity associated with at least one of a document, a message, a channel thread, an audio recording, or a communication stream;
    analyzing, by the data processing system, the keywords that meet a threshold requirement to identify a task and at least one user identity associated with the task;
    generating, by the data processing system, a task description based on the keywords;
    analyzing, by the data processing system, user activity data associated with the at least one user identity associated with the task, wherein the user activity data indicates a frequency of use of a number of user interface arrangements;
    selecting at least one user interface arrangement having a threshold level of use; and
    communicating the task description to at least one delivery software application associated with the at least one user interface arrangement having the threshold level of use, wherein the communication causes the at least one delivery software application to display the task description in the selected user interface arrangement having the threshold level of use.

2. The method of claim 1, wherein the at least one user interface arrangement is associated with a channel of a communication application, wherein the at least one user interface arrangement having the threshold level of use identifies the channel for displaying the task description.

3. The method of claim 1, wherein an operating system causes a display of the task description in an operating system notification in response to determining that the at least one user interface arrangement does not have a threshold level of use.

4. The method of claim 1, wherein the at least one user interface arrangement is associated with a word processing application, wherein the at least one user interface arrangement having the threshold level of use identifies the word processing application as the at least one delivery software application, wherein the display of the task description is arranged within the at least one user interface arrangement generated by the word processing application.

5. The method of claim 1, wherein the at least one user interface arrangement is associated with a spreadsheet application, wherein the at least one user interface arrangement having the threshold level of use identifies the spreadsheet application as the at least one delivery software application, wherein the display of the task description is arranged within the at least one user interface arrangement generated by the spreadsheet application.

6. The method of claim 1, wherein the at least one user interface arrangement is associated with a presentation application, wherein the at least one user interface arrangement having the threshold level of use identifies the presentation application as the at least one delivery software application, wherein the display of the task description is arranged within the at least one user interface arrangement generated by the presentation application.

7. The method of claim 1, wherein the at least one user interface arrangement is associated with a display of a file, wherein the at least one user interface arrangement having the threshold level of use identifies the at least one delivery software application for displaying the file, wherein the display of the task description is arranged within the at least one user interface arrangement displaying content from the file.

8. A system for providing adaptive task communication based on an analysis of user activity for improving efficiency of the system, the system comprising:
    one or more processing units; and
    a computer-readable storage medium having encoded thereon computer-executable instructions to cause the one or more processing units to perform a method comprising:
        monitoring, by the system, input data defining user activity of a plurality of users for identifying keywords from the user activity associated with at least one of a document, a message, a channel thread, an audio recording, or a communication stream;
        analyzing, by the system, the keywords that meet a threshold requirement to identify a task and at least one user identity associated with the task;
        generating, by the system, a task description based on the keywords;
        analyzing, by the system, user activity data associated with the at least one user identity associated with the task, wherein the user activity data indicates a frequency of use of a number of user interface arrangements;
        selecting at least one user interface arrangement having a threshold level of use; and
        communicating the task description to at least one delivery software application associated with the at least one user interface arrangement having the threshold level of use, wherein the communication causes the at least one delivery software application to display the task description in the selected user interface arrangement having the threshold level of use.

9. The system of claim 8, wherein the at least one user interface arrangement is associated with a channel of a communication application, wherein the at least one user interface arrangement having the threshold level of use identifies the channel for displaying the task description.

10. The system of claim 8, wherein an operating system causes a display of the task description in an operating system notification in response to determining that the at least one user interface arrangement does not have a threshold level of use.

11. The system of claim 8, wherein the at least one user interface arrangement is associated with a word processing application, wherein the at least one user interface arrangement having the threshold level of use identifies the word processing application as the at least one delivery software application, wherein the display of the task description is arranged within the at least one user interface arrangement generated by the word processing application.

12. The system of claim 8, wherein the at least one user interface arrangement is associated with a spreadsheet application, wherein the at least one user interface arrangement having the threshold level of use identifies the spreadsheet application as the at least one delivery software application, wherein the display of the task description is arranged within the at least one user interface arrangement generated by the spreadsheet application.

13. The system of claim 8, wherein the at least one user interface arrangement is associated with a presentation application, wherein the at least one user interface arrangement having the threshold level of use identifies the presentation application as the at least one delivery software application, wherein the display of the task description is arranged within the at least one user interface arrangement generated by the presentation application.

14. The system of claim 8, wherein the at least one user interface arrangement is associated with a display of a file, wherein the at least one user interface arrangement having the threshold level of use identifies the at least one delivery software application for displaying the file, wherein the display of the task description is arranged within the at least one user interface arrangement displaying content from the file.

15. A computer-readable storage medium having encoded thereon computer-executable instructions to cause one or more processing units of a system to perform a method comprising:
  monitoring, by the system, input data defining user activity of a plurality of users for identifying keywords from the user activity associated with at least one of a document, a message, a channel thread, an audio recording, or a communication stream;
  analyzing, by the system, the keywords that meet a threshold requirement to identify a task and at least one user identity associated with the task;
  generating, by the system, a task description based on the keywords;
  analyzing, by the system, user activity data associated with the at least one user identity associated with the task, wherein the user activity data indicates a frequency of use of a number of user interface arrangements;
  selecting at least one user interface arrangement having a threshold level of use; and
  communicating the task description to at least one delivery software application associated with the at least one user interface arrangement having the threshold level of use, wherein the communication causes the at least one delivery software application to display the task description in the selected user interface arrangement having the threshold level of use.

16. The computer-readable storage medium of claim 15, wherein the at least one user interface arrangement is associated with a channel of a communication application, wherein the at least one user interface arrangement having the threshold level of use identifies the channel for displaying the task description.

17. The computer-readable storage medium of claim 15, wherein an operating system causes a display of the task description in an operating system notification in response to determining that the at least one user interface arrangement does not have a threshold level of use.

18. The computer-readable storage medium of claim 15, wherein the at least one user interface arrangement is associated with a word processing application, wherein the at least one user interface arrangement having the threshold level of use identifies the word processing application as the at least one delivery software application, wherein the display of the task description is arranged within the at least one user interface arrangement generated by the word processing application.

19. The computer-readable storage medium of claim 15, wherein the at least one user interface arrangement is associated with a spreadsheet application, wherein the at least one user interface arrangement having the threshold level of use identifies the spreadsheet application as the at least one delivery software application, wherein the display of the task description is arranged within the at least one user interface arrangement generated by the spreadsheet application.

20. The computer-readable storage medium of claim 15, wherein the at least one user interface arrangement is associated with a presentation application, wherein the at least one user interface arrangement having the threshold level of use identifies the presentation application as the at least one delivery software application, wherein the display of the task description is arranged within the at least one user interface arrangement generated by the presentation application.

* * * * *